United States Patent
Tchon et al.

(10) Patent No.: US 10,168,782 B1
(45) Date of Patent: Jan. 1, 2019

(54) ULTRASONIC HAPTIC FEEDBACK CONTROL SYSTEM AND METHOD

(71) Applicant: Rockwell Collins, Inc., Cedar Rapids, IA (US)

(72) Inventors: Joseph L. Tchon, Cedar Rapids, IA (US); Tracy J. Barnidge, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/614,273

(22) Filed: Jun. 5, 2017

(51) Int. Cl.
  *G06F 3/01* (2006.01)
  *G06F 3/0484* (2013.01)
  *G05D 1/00* (2006.01)

(52) U.S. Cl.
  CPC ............. *G06F 3/016* (2013.01); *G05D 1/005* (2013.01); *G05D 1/0016* (2013.01); *G06F 3/017* (2013.01); *G06F 3/04845* (2013.01)

(58) Field of Classification Search
  CPC .... G08G 5/0021; G08G 5/025; G08G 5/0091; G08G 5/0034; G08G 5/0047; G08G 5/065; G08G 5/045; G08G 5/003; G06F 3/013; G06F 3/016; G06F 3/017
  See application file for complete search history.

(56) References Cited

U.S. PATENT DOCUMENTS

| | | | |
|---|---|---|---|
| 9,612,658 B2 | 4/2017 | Subramanian et al. | |
| 9,805,606 B2 * | 10/2017 | Coulmeau | G08G 5/0039 |
| 2005/0098681 A1 * | 5/2005 | Berson | B64C 30/00 244/1 N |
| 2009/0157293 A1 * | 6/2009 | Cornett | G01C 21/3453 701/415 |
| 2016/0179327 A1 * | 6/2016 | Zammit-Mangion | G01C 23/00 701/7 |
| 2017/0337826 A1 * | 11/2017 | Moran | B64C 39/024 |

OTHER PUBLICATIONS

UHDK5 by EBV Chips, Development Kits, Avnet EMEA, Printed online: https://www.avnet.com/shop/emea/p/kits-and-tools/development-kits/ebv-chips-ebv/uhdk5 on Apr. 17, 2017, 1 page.

(Continued)

*Primary Examiner* — Gerald Johnson
(74) *Attorney, Agent, or Firm* — Angel N. Gerdzhikov; Donna P. Suchy; Daniel M. Barbieri

(57) ABSTRACT

A system may include a display, a haptic feedback system including ultrasonic transducers, a gesture recognition system, and a processor. The processor may be configured to output a stream of graphical data to the display, output a stream of haptic feedback data to the haptic feedback system, and output user-manipulatable region data to the gesture recognition system. The display may be configured to present a stream of images. The ultrasonic transducers may be configured to form an ultrasonic acoustic field in front of the display. The gesture recognition system may be configured to recognize a user gesture in the user-manipulatable region as a user input and to output gesture recognition data to the processor. The processor may be further configured to update the stream of graphical data and the stream of haptic feedback data based at least on the gesture recognition data.

20 Claims, 15 Drawing Sheets

(56) References Cited

OTHER PUBLICATIONS

Utrahaptics—a remarkable connection with technology, Printed online: https://www.ultrahaptics.com/products/evaluation-kit/, Apr. 17, 2017, 3 pages.

Ultrahaptics, Touch Development Kit (UHDK5), Printed online: https://developer.ultrahaptics.com/wp-content/uploads/2016/12/TOUCH-UHDK5-Development-Kit-product-brief.pdf, Apr. 17, 2017.

* cited by examiner

ULTRASONIC HAPTIC FEEDBACK CONTROL SYSTEM AND METHOD

BACKGROUND

Aircraft control panels and aircraft displays with three-dimensional sensing inputs for recognizing user gestures lack a physical, perceivable surface in a three-dimensional active sensing region. The lack of a physical, perceivable surface makes it difficult for users to maintain their hand positions relative to the three-dimensional active sensing region.

SUMMARY

In one aspect, embodiments of the inventive concepts disclosed herein are directed to a system. The system may include a display, a haptic feedback system, a gesture recognition system, and a processor. The haptic feedback system may include ultrasonic transducers. The gesture recognition system may include a gesture recognition system processor and a sensor. The processor may be communicatively coupled to the display, the haptic feedback system, and the gesture recognition system. The processor may be configured to output a stream of graphical data to the display. The processor may be further configured to output a stream of haptic feedback data to the haptic feedback system, the stream of haptic feedback data synchronized with the stream of graphical data. The processor may be further configured to output user-manipulatable region data to the gesture recognition system, the user-manipulatable region data including information of a user-manipulatable region in front of the display. The display may be configured to present a stream of images corresponding to the stream of graphical data. The ultrasonic transducers may be configured to, based at least on the stream of the haptic feedback data, form an ultrasonic acoustic field in front of the display. The gesture recognition system may be configured to recognize a user gesture in the user-manipulatable region as a user input and to output gesture recognition data to the processor. The processor may be further configured to update the stream of graphical data and the stream of haptic feedback data based at least on the gesture recognition data.

In a further aspect, embodiments of the inventive concepts disclosed herein are directed to a method. The method may include receiving, by a processor, flight management system data. The method may additionally include, based at least on the flight management system data, outputting, by the processor, a stream of graphical data to a display, a stream of haptic feedback data to a haptic feedback system, and user-manipulatable region data to a gesture recognition system. The stream of haptic feedback data may be synchronized with the stream of graphical data. The user-manipulatable region data may include information of a user-manipulatable region in front of a screen of the display. The method may also include presenting, by the display, a stream of images corresponding to the stream of graphical data. The method may further include, based at least on the stream of the haptic feedback data, forming, by ultrasonic transducers of the haptic feedback system, an ultrasonic acoustic field in front of the screen of the display. The method may additionally include recognizing, by the gesture recognition system including a gesture recognition system processor and a sensor, a user gesture in the user-manipulatable region as a user input. The method may also include, in response to recognizing the user gesture in the user-manipulatable region as the user input, outputting, by the gesture recognition system processor, gesture recognition data to the processor. The method may further include, based at least on the gesture recognition data, updating, by the processor, the stream of graphical data and the stream of haptic feedback data.

In a further aspect, embodiments of the inventive concepts disclosed herein are directed to a system. The system may include a display, a haptic feedback system, a gesture recognition system, and a processor. The haptic feedback system may include ultrasonic transducers. The gesture recognition system may include a gesture recognition system processor and a sensor. The processor may be communicatively coupled to the display, the haptic feedback system, and the gesture recognition system. The processor may be configured to receive flight management system data. The processor may be further configured to, based at least on the flight management system data, output a stream of graphical data to the display, a stream of haptic feedback data to the haptic feedback system, and a user-manipulatable region data to the gesture recognition system. The stream of haptic feedback data may be synchronized with the stream of graphical data. The user-manipulatable region data may include information of a user-manipulatable region in front of the display. The display may be configured to present a stream of images corresponding to the stream of graphical data. The ultrasonic transducers may be configured to, based at least on the stream of the haptic feedback data, form an ultrasonic acoustic field in front of the display. The gesture recognition system may be configured to recognize a user gesture in the user-manipulatable region as a user input and to output gesture recognition data to the processor. The processor may be further configured to update the stream of graphical data and the stream of haptic feedback data based at least on the gesture recognition data.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
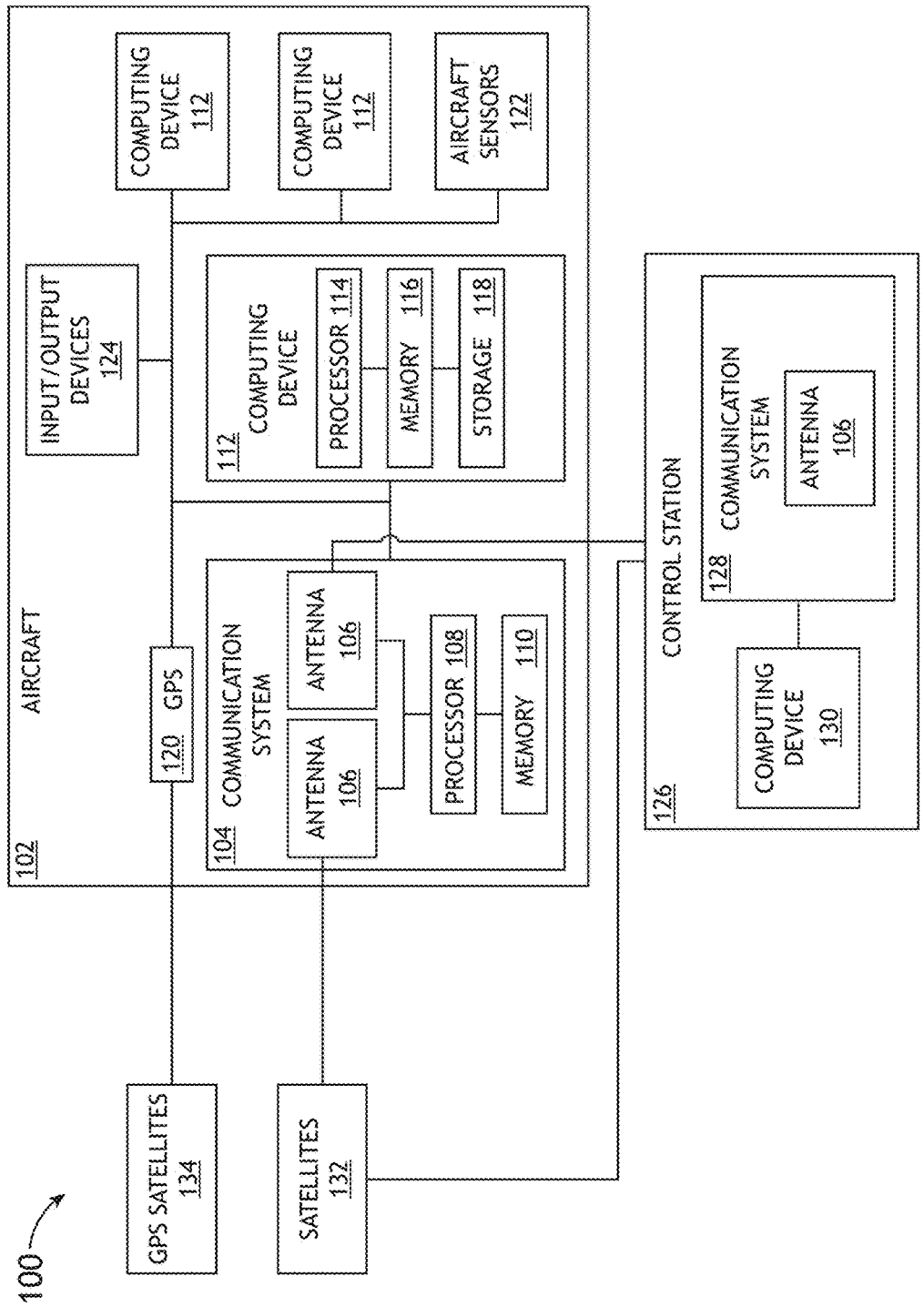
FIG. 1 is a view of an exemplary embodiment of a system including an aircraft, a control station, satellites, and global positioning system satellites according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method, system, and at least one device. A display may be implemented with and/or augmented with a haptic feedback system configured to form a dynamic ultrasonic acoustic field relative to the display surface. The dynamic ultrasonic acoustic field may include distinct pressure pattern regions that result in distinct tactile sensations by a user. For example, the haptic feedback system permits a user to feel pressure patterns of the ultrasonic acoustic field as three-dimensional gesture feedback. For example, a display implemented with and/or augmented with a haptic feedback system can improve a pilot's situational awareness, provide direct control feedback, and/or provide a verification to a pilot's activation of a function(s). For example, utilizing a haptic feedback system configured to form an ultrasonic acoustic field relative to the display allows multi-sensory pilot interaction even if the pilot is not looking at the display. A display implemented with and/or augmented with a haptic feedback system may provide a tighter coupling between the operator (e.g., pilot or ground controller) and the vehicle systems (e.g., moving map topography of an aircraft) and orientation (e.g., aircraft pitch, roll, and/or yaw). A display implemented with and/or augmented with a haptic feedback system may be used to leverage a remote operator's haptic senses to offer a "feel" of control inputs and/or feedback from aircraft flight control surfaces.

In some embodiments, a display implemented with and/or augmented with a haptic feedback system may be configured to guide a user's hand to a proper location in a three-dimensional user-manipulatable region, for example such that a gesture may be recognized in the user-manipulatable region. In some embodiments, a display implemented with and/or augmented with a haptic feedback system may be configured to display graphical content (e.g., a moving-map, topological information, and/or an instrument approach plate) and to form a synchronized ultrasonic acoustic field (e.g., synchronized to the displayed content) so as to provide user situational awareness and ease of interpretation of visual information being displayed. For example, a synchronized ultrasonic acoustic field may allow a pilot to feel mountains and valleys in an upcoming instrument approach in unfamiliar terrain.

In some embodiments, a display implemented with and/or augmented with a haptic feedback system may be configured to form an ultrasonic acoustic field including ultrasonic reference points to aid a user in positioning the user's hand relative to one or more of the ultrasonic reference points. For example, the ultrasonic reference points may include reference points corresponding to a screen center and/or screen corners. Such ultrasonic reference points may provide the user with a three-dimensional reference of where the user's hand is in space or whether the user's hand is a user-manipulatable region for gesture commands. Additionally, for example, the ultrasonic acoustic field may include user-manipulatable ultrasonic objects, such as ultrasonic cursor representations, which the user may manipulate (e.g., move) via a gesture recognition system while the haptic feedback system provides ultrasonic feedback corresponding to the user's manipulations.

In some embodiments, a display implemented with and/or augmented with a haptic feedback system and a gesture recognition system may be configured to enhance remote operator control of a vehicle (e.g., an aircraft) by providing haptic ultrasonic feedback with respect to various aircraft operations and/or components (e.g., aileron, rudder, elevator flight controls, etc.) while the user controls the vehicle by performing hand gestures in a three-dimensional user-manipulatable region. For example, the display implemented with and/or augmented with a haptic feedback system may provide haptic ultrasonic feedback during phases of sensitive maneuvering (e.g., flare for landing, fine adjustments to reposition sensors, and/or targeting).

Referring now to FIG. 1, an exemplary embodiment of a system 100 according to the inventive concepts disclosed herein includes at least one vehicle (e.g., aircraft 102), a control station 126, satellites 132, and global positioning system (GPS) satellites 134. Some or all of the aircraft 102, the control station 126, the satellites 132, and the GPS satellites 134 may be communicatively coupled at any given time.

The aircraft 102 includes at least one communication system 104, a plurality of computing devices 112 (which may also be referred to as aircraft computing devices, vetronics computing devices (e.g., avionics computing devices), aircraft computing devices, or vehicular computing devices as may be appropriate), a GPS device 120, aircraft sensors 122, and input/output devices 124, as well as other systems, equipment, and devices commonly included in vehicles (e.g., aircraft). Some or all of the communication system 104, the computing devices 112, the GPS device 120, the aircraft sensors 122, the input/output devices 124, and any other systems, equipment, and devices commonly included in the aircraft 102 may be communicatively coupled. While not shown, in some embodiments, the aircraft 102 may optionally include a network operations center (NOC) or include components (e.g., at least one computing device 112 and/or the communication system 104) configured to perform functionality similar to a NOC. The aircraft 102 may be implemented as any suitable aircraft. While the system 100 is exemplarily shown as including the aircraft 102, in some embodiments the inventive concepts disclosed herein may be implemented in or on computing devices of any suitable vehicle.

The communication system 104 includes one or more antennas 106 (e.g., two antennas 106, as shown), a processor 108, and memory 110, which are communicatively coupled. The communication system 104 (such as via one or more of the antennas 106) is configured to send and/or receive signals, data, messages, and/or voice transmissions to and/or from the control station 126, other vehicles, the satellites 132, and combinations thereof, as well as any other suitable devices, equipment, or systems. That is, the communication system 104 is configured to exchange (e.g., bi-directionally exchange) signals, data, messages, and/or voice communications with any other suitable communication system (e.g., which may be implemented similarly and function similarly to the communication system 104). Additionally, for example, the communication system 104 may be configured to exchange, send, and/or receive (e.g., via a wireless connection, a cabled connection, and/or a wired connection, a passenger broadband service connection, a safety services connection, or a combination thereof) signals, data, messages, and/or voice communications with, to, and/or from any suitable onboard device(s).

The communication system 104 may include at least one processor 108 configured to run or execute various software applications, computer code, and/or instructions stored (e.g., maintained) in at least one non-transitory computer-readable medium (e.g., at least one computer-readable medium implemented as hardware; e.g., at least one non-transitory processor-readable medium, at least one memory 110 (e.g., at least one nonvolatile memory, at least one volatile memory, or a combination thereof; e.g., at least one random-access memory, at least one flash memory, at least one read-only memory (ROM) (e.g., at least one electrically erasable programmable ROM (EEPROM), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof). Some or all of the at least one computer-readable medium may be communicatively coupled. For example, the processor 108 may be configured to receive data from the computing devices 112 and execute instructions configured to cause a particular antenna of the antennas 106 to transmit the data as a signal(s) to another communication system (e.g., 128) of the system 100. Likewise, for example, the processor 108 may be configured to route data received as a signal(s) by a particular antenna of the antennas 106 to one or more of the computing devices 112. In some embodiments, the processor 108 may be implemented as one or more radiofrequency (RF) processors.

Each of the antennas 106 may be implemented as or may include any suitable antenna or antenna device. For example, the antennas 106 may be implemented as or include at least one electronically scanned array (ESA) (e.g., at least one active ESA (AESA)), at least one radio (e.g., at least one software defined radio (SDR)), at least one transmitter, at least one receiver, at least one transceiver, or a combination thereof.

While the communication system 104 is shown as having two antennas 106, one processor 108, and memory 110, the communication system 104 may include any suitable number of antennas 106, processors 108, and memory 110. Further, the communication system 104 may include other components, such as a storage device (e.g., solid state drive or hard disk drive), radio tuners, and controllers.

Each of the computing devices 112 of the aircraft 102 may include at least one processor 114, memory 116, and storage 118, as well as other components, equipment, and/or devices commonly included in a computing device, all of which may be communicatively coupled to one another. Each of the computing devices 112 may be configured to route data to each other as well as to the communication system 104 for transmission to an off-board destination (e.g., satellites 132, control station 126, or a combination thereof). Likewise, each computing device 112 may be configured to receive data from another computing device 112 as well as from the communication system 104 transmitted from off-board sources (e.g., satellites 132, control station 126, or a combination thereof). The computing device 112 may include or may be implemented as and/or be configured to perform the functionality of any suitable aircraft system, such as flight management system (FMS) (e.g., 112-1), a processing and video generation system computing device (e.g., 112-2), haptic feedback system computing device (e.g., 240), an engine indication and crew alerting system (EICAS) computing device, an integrated flight information system (IFIS) computing device, an information management system (IMS) computing device, an onboard maintenance system (OMS) computing device, and a terrain awareness and warning system (TAWS) computing device. The processor 114 may be configured to run various software applications or computer code stored (e.g., maintained) in a non-transitory computer-readable medium (e.g., at least one computer-readable medium implemented as hardware; e.g., at least one non-transitory processor-readable medium, at least one memory 116 (e.g., at least one nonvolatile memory, at least one volatile memory, or a combination thereof; e.g., at least one random-access memory, at least one flash memory, at least one ROM (e.g., at least one EEPROM, at least one on-processor memory (e.g., at least one on-processor cache, at least one on-processor buffer, at least one on-processor flash memory, at least one on-processor EEPROM, or a combination thereof), or a combination thereof), at least one storage device 118 (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof) and configured to execute various instructions or operations. Additionally, for example, the computing devices 112 or the processors 114 may be implemented as special purpose computers or special purpose processors configured (e.g., programmed) to execute instructions for performing any or all of the operations disclosed throughout. In some embodiments, the aircraft 102 may include any suitable number of computing devices 112.

The GPS device 120 receives location data from the GPS satellites 134 and may provide vehicular location data (e.g., aircraft location data) to any of various equipment/systems of the aircraft 102 (e.g., the communication system 104, the computing devices 112, the aircraft sensors 122, and the input/output devices 124). For example, the GPS device 120 may be implemented as a global navigation satellite system (GNSS) device, and the GPS satellites 134 may be implemented as GNSS satellites. The GPS device 120 may include a GPS receiver and a processor. For example, the GPS device 120 may receive or calculate location data from a sufficient number (e.g., at least four) of GPS satellites 134 in view of the aircraft 102 such that a GPS solution may be calculated. In some embodiments, the GPS device 120 may be implemented as or as part of a computing device 112, the communication system 104, navigation sensors of the aircraft sensors 122, and/or one of the input/output devices 124. The GPS device 120 may be configured to provide the location data to any of various equipment/systems of a vehicle. For example, the GPS device 120 may provide location data to the computing devices 112, the communication system 104, and the input/output devices 124. Further, while FIG. 1 depicts the GPS device 120 implemented in the aircraft 102, in other embodiments, the GPS device 120 may be implemented in or on any type of aircraft.

While the communication system 104, the computing devices 112, the GPS device 120, the aircraft sensors 122, and the input/output devices 124 of the aircraft 102 have been exemplarily depicted as being implemented as separate devices or systems, in some embodiments, some or all of the communication system 104, the computing devices 112, the GPS device 120, the aircraft sensors 122, and/or the input/output devices 124 may be implemented as a single integrated system or device or as any number of integrated and/or partially integrated systems and/or devices.

The control station 126 includes at least one communication system 128 and at least one computing device 130, as well as other systems, equipment, and devices commonly included in a control station. Some or all of the communication system 128, the computing device 130, and other systems, equipment, and devices commonly included in a control station may be communicatively coupled. The control station 126 may be implemented as a fixed location ground control station (e.g., a ground control station of an air traffic control tower, or a ground control station of a network operations center) located on the ground of the earth. In some embodiments, the control station 126 may be implemented as a mobile ground control station (e.g., a ground control station implemented on a non-airborne vehicle (e.g., an automobile or a ship) or a trailer). In some embodiments, the control station 126 may be implemented as an air control station implemented on an airborne vehicle (e.g., aircraft). The control station 126 may include a NOC or be communicatively coupled to a NOC (e.g., via any suitable network(s)).

The communication system 128 and components thereof (such as antenna 106) of the control station 126 may be implemented similarly to the communication system 104 except that, in some embodiments, the communication system 128 may be configured for operation at a fixed location. The computing device 130 and components thereof (such as a processor (not shown) and memory (not shown)) of the control station 126 may be implemented similarly to the computing devices 112.

While the antennas 106 are exemplarily depicted as being implemented in the aircraft 102 and the control station 126, in some embodiments, antennas 106 may be implemented in, on, or coupled to any other suitable device, equipment, or system, such as a computing device (e.g., a laptop computing device, a mobile computing, a wearable computing device, or a smart phone), a mobile communication system (e.g., a man pack communication system), or satellites 132.

While FIG. 1 exemplarily includes elements as shown, in some embodiments, one or more of the elements of the system 100 may be omitted, or the system 100 may include other elements. For example, one or more of the GPS satellites 134, satellites 132, and the control station 126 may be optional. Additionally, while an embodiment has been depicted as including one control station (e.g., the control station 126), other embodiments may include any number of control stations of various types positioned or moving anywhere in the system 100.

Figure 2:
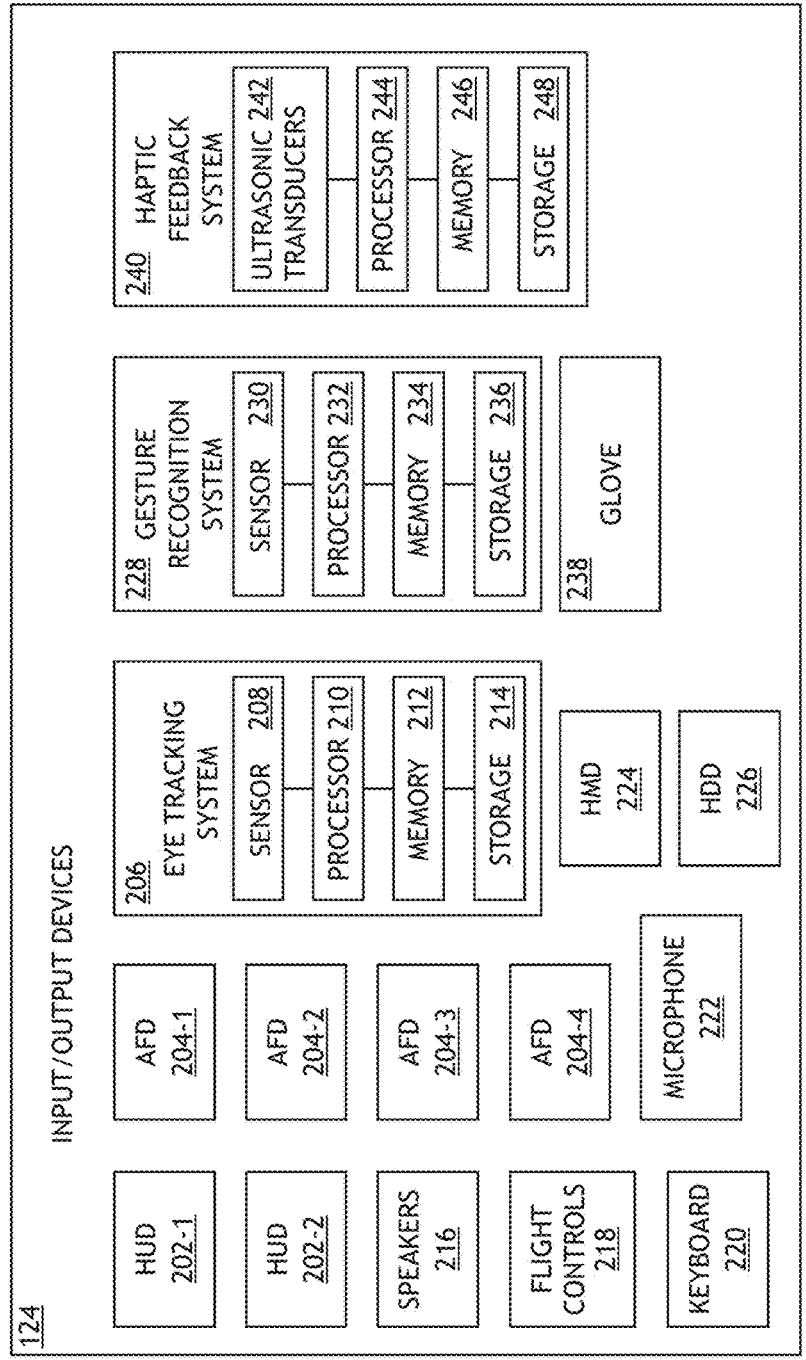
FIG. 2 is a view of the input/output devices of the aircraft of FIG. 1 according to the inventive concepts disclosed herein.

Referring now to FIG. 2, the input/output devices 124 of the aircraft 102 of FIG. 1 may include one or more displays (e.g., at least one head-up display (HUD), at least one adaptive flight display (AFD), at least one head-down display (HDD), at least one head-worn display (HWD) (e.g., at least one helmet-worn display and/or at least one binocular display) or a combination thereof), at least one eye tracking system 206, speakers 216, flight controls 218, at least one keyboard 220, at least one microphone 222, at least one gesture recognition system 228, at least one wearable user input/output device (e.g., a glove 238), a haptic feedback system 240, or a combination thereof, some or all of which may be communicatively coupled at any given time. While FIG. 2 depicts the various exemplary input/output devices 124, the input/output devices 124 may include any suitable input/output devices.

The input/output devices 124 may be configured to present information, content, and/or feedback to a pilot of the aircraft 102. Additionally, the input/output devices 124 may be configured to receive inputs from the pilot of the aircraft 102.

For example, the speakers 216 may be configured to audibly present audible content to the pilot of the aircraft 102. For example, one or more of the displays may be configured to present graphical content to the pilot of the aircraft 102. Additionally, for example, the haptic feedback system 240 may be configured to output a dynamically variable ultrasonic acoustic field, which may be felt by the pilot as tactile sensations.

For example, the displays of the input/output devices 124 may include two HUDs 202-1, 202-2 (which may collectively be referred to as HUDs 202), four AFDs 204-1, 204-2, 204-3, 204-4 (which may collectively be referred to as AFDs 204), a head-worn display (e.g., a helmet-mounted display (HMD) 224), and a head-down display (HDD) 226. In some embodiments, the AFDs 204 are implemented as HDDs. Each of the displays may be configured to present streams of images (e.g., as video or still images) to a user (e.g., a pilot). In some embodiments, the HUDs 202, AFDs 204, and/or the HDD 226 may include a touch/gesture interface. In some embodiments, one or more of the HUDs 202, AFDs 204, and the HDD 226 may be implemented as the haptic feedback system 240 and/or include elements of a haptic feedback system; for example, the AFDs 204 and/or the HDD 226 may be implemented as a haptic feedback display system (e.g., a haptic feedback touchscreen display system), which includes a plurality of ultrasonic transducers 230. In some embodiments, one or more of the HUDs 202, AFDs 204, HDD 226, and/or the HMD 224 may include an integrated computing device (which may be implemented and function similarly to one of the computing devices 112 of FIG. 1) and/or integrated computing device components (which may be implemented and function similarly to components of one of the computing devices 112 of FIG. 1). In some embodiments, the aircraft 102 may include any suitable number of any suitable types of displays. For example, the aircraft 102 may include two HDDs 226, such as a first HDD 226 for a pilot and second HDD 226 for a copilot. Each of the displays may be communicatively coupled to one or more of the computing devices 112, the communication system 104, the GPS device 120, other of the input/output devices 124, and/or the aircraft sensors 122 of FIG. 1.

The eye tracking system 206 is configured to track eye gestures, track movement of a user's eye, track a user's gaze, and/or otherwise receive inputs from a user's eyes. The eye tracking system 206 may be configured for performing fully automatic eye tracking operations of users in real time. The eye tracking system 206 may include at least one sensor 208, at least one processor 210, a memory 212, and a storage 214, as well as other components, equipment, and/or devices commonly included in an eye tracking system. The sensor 208, the processor 210, the memory 212, and the storage 214, as well as the other components, equipment, and/or devices commonly included in the eye tracking system 206 may be communicatively coupled.

Each sensor 208 may be implemented as any of various sensors suitable for an eye tracking system. For example, the at least one sensor 208 may include or be implemented as one or more optical sensors (e.g., at least one camera configured to capture images in the visible light spectrum and/or the infrared spectrum). In some embodiments, the at least one sensor 208 is one or more dedicated eye tracking system sensors. While the sensor 208 has been exemplarily depicted as being included in the eye tracking system 206, in some embodiments, the sensor 208 may be implemented external to the eye tracking system 206. For example, the sensor 208 may be implemented as an optical sensor (e.g., of the optical sensors 316 of the aircraft sensors 122) located within the aircraft 102 and communicatively coupled to the processor 210.

The processor 210 may be configured to process data received from the sensor 208 and output processed data to one or more onboard devices or onboard systems (e.g., the communication system 104, the computing devices 112, the aircraft sensors 122, other of the input/output devices 124, or a combination thereof). For example, the processor 210 may be configured to generate eye tracking data and output the generated eye tracking data to one of the computing devices 112. The processor 210 of the eye tracking system 206 may be configured to run various software applications or computer code stored (e.g., maintained) in a non-transitory computer-readable medium (e.g., memory 212 and/or storage 214) and configured to execute various instructions or operations. The processor 210 may be implemented as a special purpose processor configured to execute instructions for performing any or all of the operations disclosed throughout.

The gesture recognition system 228 may be configured to detect gestures (e.g., hand gestures) as user inputs. The gesture recognition system 228 may be configured for detecting hand gestures of users in real time. The gesture recognition system 228 may include at least one sensor 230, at least one processor 232, a memory 234, and a storage 236, as well as other components, equipment, and/or devices commonly included in an gesture recognition system. The sensor 230, the processor 232, the memory 234, and the storage 236, as well as the other components, equipment, and/or devices commonly included in the gesture recognition system 228 may be communicatively coupled.

Each sensor 230 may be implemented as any of various sensors suitable for a gesture recognition system. For example, the at least one sensor 230 may include or be implemented as one or more optical sensors (e.g., at least one camera configured to capture images in the visible light spectrum and/or the infrared spectrum). In some embodiments, the at least one sensor 230 is one or more dedicated gesture recognition system sensors; however, for example, the gesture recognition system 228 and the eye tracking system 206 may be integrated and/or share a common sensor. While the sensor 230 has been exemplarily depicted as being included in the gesture recognition system 228, in some embodiments, the sensor 230 may be implemented external to the gesture recognition system 228. For example, the sensor 230 may be implemented as an optical sensor (e.g., of the optical sensors 316 of the aircraft sensors 122) located within the aircraft 102 and communicatively coupled to the processor 232.

The processor 232 may be configured to process data received from the sensor 230 and output processed data to one or more onboard devices or onboard systems (e.g., the communication system 104, the computing devices 112, the aircraft sensors 122, other of the input/output devices 124, or a combination thereof). For example, the processor 232 may be configured to generate gesture recognition data corresponding to detected hand gestures and output the generated gesture recognition data to one of the computing devices 112. The processor 232 of the gesture recognition system 228 may be configured to run various software applications or computer code stored (e.g., maintained) in a non-transitory computer-readable medium (e.g., memory 234 and/or storage 236) and configured to execute various instructions or operations. The processor 232 may be implemented as a special purpose processor configured to execute instructions for performing any or all of the operations disclosed throughout.

The haptic feedback system 240 may include a plurality of ultrasonic transducers 242, at least one processor 244, a memory 246, and storage 248, as well as other components, equipment, and/or devices commonly included in a haptic feedback system. The ultrasonic transducers 242, the processor 244, the memory 246, and the storage 248, as well as the other components, equipment, and/or devices commonly included in the haptic feedback system 240 may be communicatively coupled. By dynamically controlling and driving the ultrasonic transducers 242, the haptic feedback system 240 may be configured to form an ultrasonic acoustic field (e.g., a dynamically variable ultrasonic acoustic field), which may be felt by the pilot as tactile sensations. In some embodiments, the haptic feedback system 240 may include components of, may be implemented similarly to, and/or may function similarly to the method and apparatus disclosed in U.S. Pat. No. 9,612,658, titled "Method and Apparatus for Providing Tactile Sensations", which is incorporated by reference in its entirety.

The processor 244 may be configured to process data received from one or more of the computing devices 112 (e.g., a flight management system (FMS) computing device 112-1 and/or a video processing and generation system computing device 112-2), one or more of the input output devices 124 (e.g., the gesture recognition system 228 and/or a touchscreen display), and/or the aircraft sensors 122. Based on the received data, the processor 244 may cause the ultrasonic transducers 242 to form an ultrasonic acoustic field perceivable by the pilot. In some embodiments, the haptic feedback system 240 includes a driver circuit coupled between the processor 244 and the ultrasonic transducers 242, and the processor 244 causes (e.g., controls) the driver circuit to drive the ultrasonic transducers 242 so as to form an ultrasonic acoustic field perceivable by the pilot. At any given time, the processor 244 may cause the ultrasonic transducers 242 to form an ultrasonic acoustic field(s) having any suitable location(s), any suitable size(s), and any suitable characteristics (e.g., pressure patterns, frequencies, or combinations thereof). Each of the ultrasonic transducers 242 may be configured to produce ultrasonic sound pressure over an angle of directivity (e.g., 60 degrees). Each of the ultrasonic transducers 242 may be configured to transmit ultrasonic waves over any suitable frequency range (e.g., between 20 kilohertz (kHz) and 500 kHz, such as approximately 40 kHz). For example, the ultrasonic transducers 242 may be configured to form an ultrasonic acoustic field that results in a spatial distribution of pressure patterns such that different pressure patterns located at different locations in space are distinguishable by a pilot. For example, a first region of a formed acoustic field may result in a tactile sensation distinguishable from a second region of the formed acoustic field. The processor 244 may be configured to independently control individual ultrasonic transducers 242 so as to form an ultrasonic acoustic field having particular pressure patterns at particular locations based on data received by the one or more of the computing devices 112 (e.g., a flight management system (FMS) computing device 112-1 and/or a video processing and generation system computing device 112-2), one or more of the input output devices 124 (e.g., the gesture recognition system 228 and/or a touchscreen display), and/or the aircraft sensors 122. The processor 244 of the haptic feedback system 240 may be configured to run various software applications or computer code stored (e.g., maintained) in a non-transitory computer-readable medium (e.g., memory 246 and/or storage 248) and configured to execute various instructions or operations. The processor 244 may be implemented as a special purpose processor configured to execute instructions for performing any or all of the operations disclosed throughout.

In some embodiments, the haptic feedback system 240 may be integrated in any suitable display (e.g., AFDs 204 and/or the HDD 226).

In some embodiments, some or all of the input/output devices 124 may include an integrated computing device (which may be implemented and function similarly to one of the computing devices 112 of FIG. 1) and/or integrated computing device components (which may be implemented and function similarly to components of one of the computing devices 112 of FIG. 1).

Figure 3:
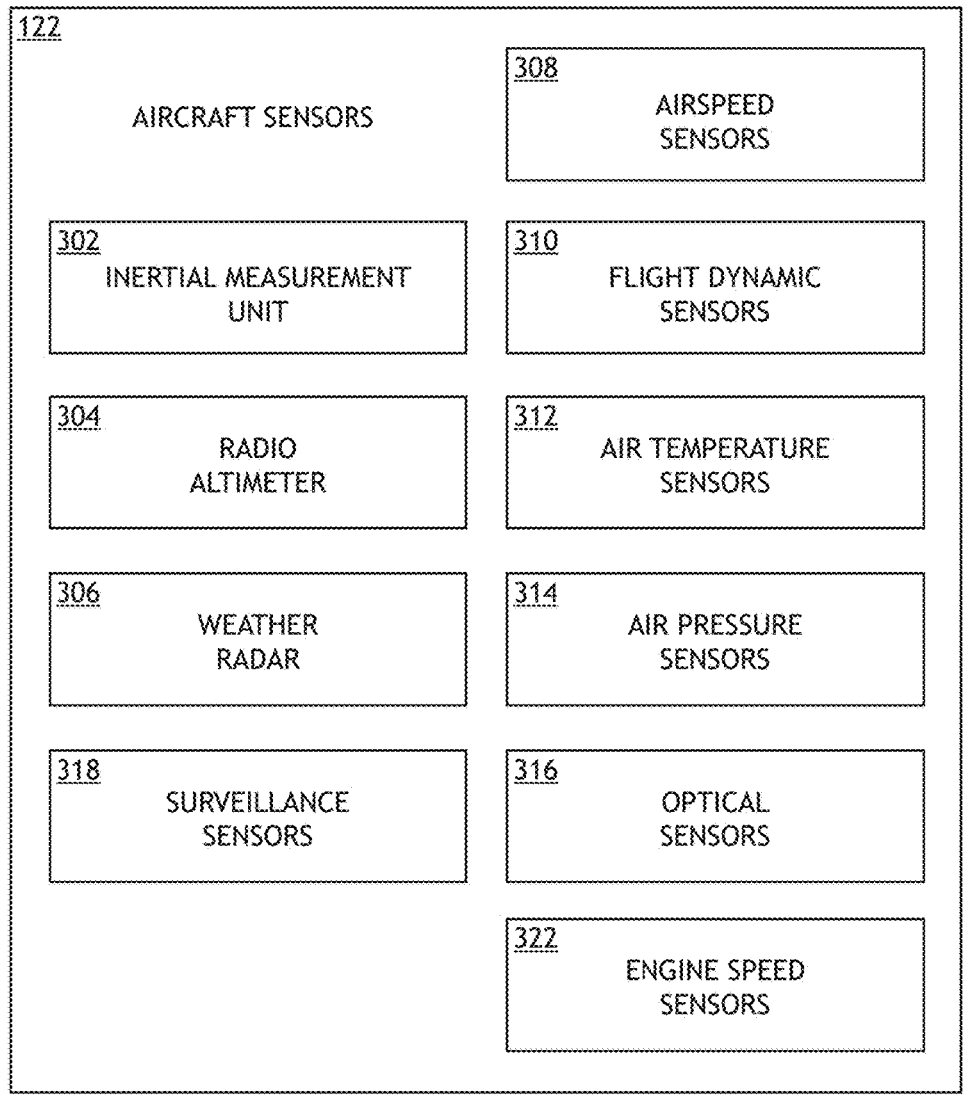
FIG. 3 is a view of the aircraft sensors of the aircraft of FIG. 1 according to the inventive concepts disclosed herein.

Referring now to FIG. 3, the aircraft sensors 122 of FIG. 1 are shown. Each of the aircraft sensors 122 may be configured to sense a particular condition(s) external or internal to the aircraft 102 or within the aircraft 102 and output data associated with particular sensed condition(s) to one or more onboard devices or onboard systems (e.g., the communication system 104, the computing devices 112, the aircraft sensors 122, the input/output devices 124, or a combination thereof). For example, the aircraft sensors 122 may include an inertial measurement unit 302, a radio altimeter 304, weather radar 306, airspeed sensors 308, flight dynamic sensors 310 (e.g., configured to sense pitch, bank, roll, heading, and/or yaw), air temperature sensors 312, air pressure sensors 314, optical sensors 316 (e.g., cameras configured to capture images in the visible light spectrum and/or the infrared spectrum), surveillance sensors 318, and engine speed sensor 322, some or all of which may be communicatively coupled at any given time. Additionally, the GPS device 120 may be considered as one of the aircraft sensors 122.

For example, at least some of the aircraft sensors 122 may be implemented as navigation sensors (e.g., the GPS device 120, the inertial measurement unit 302, a radio altimeter 304, weather radar 306, airspeed sensors 308, flight dynamic sensors 310, air temperature sensors 312, and/or air pressure sensors 314) configured to sense any of various flight conditions or aircraft conditions typically used by aircraft and output navigation data (e.g., aircraft location data, aircraft orientation data, aircraft direction data, aircraft speed data, and/or aircraft acceleration data). For example, various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft bank, aircraft roll, aircraft yaw, aircraft heading, air temperature, and/or air pressure. For example, the GPS device 120 and the inertial measurement unit 302 may provide aircraft location data and aircraft orientation data, respectively, to a processor (e.g., a processor of the GPS device 120, processor 114, processor 114-1, processor 114-2, processor 108, processor 210, processor 232, processor 244, or a combination thereof).

For example, the engine speed sensor 322 may be configured to measure the rotation speed of the engine and variations of the engine speed.

In some embodiments, some or all of the aircraft sensors 122 may include an integrated computing device (which may be implemented and function similarly to one of the computing devices 112 of FIG. 1) and/or integrated computing device components (which may be implemented and function similarly to components of one of the computing devices 112 of FIG. 1).

Figure 4:
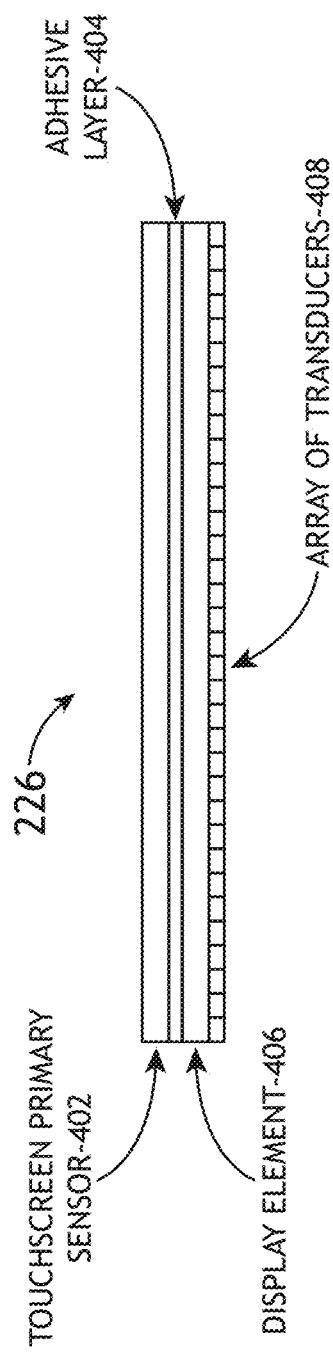
FIG. 4 is a cross-sectional diagram of a portion of the head down display of FIG. 2 according to the inventive concepts disclosed herein.

Referring now to FIG. 4, a cross-sectional diagram of a portion of an exemplary HDD 226 implemented according to the inventive concepts disclosed herein is shown. The HDD 226 may be implemented as a haptic feedback touchscreen display system. The HDD 226 may include a touchscreen primary sensor 402, an adhesive layer 404, a display element 406, and a plurality of ultrasonic transducers 242 (e.g., an array 408 of ultrasonic transducers 242). The HDD 226 may include one or more other components such as a cover transparent substrate, other substrates (such as plastic or glass substrates), other adhesive layers, light control films, polarizing films, a gap, a diffuser, a backlight, support structure, an electromagnetic interference (EMI) shield, a bezel, a housing, communicative coupling elements (e.g., wires, cables, connectors), connectivity ports, a power supply, a processor, a circuit board (e.g., printed circuit board (PCB)), a controller, memory, storage, an antenna, or the like. Some or all of the components of the HDD 226 may be communicatively coupled.

The touchscreen primary sensor 402 may be configured to sense a touch or near touch (such as a finger or apparatus (e.g., a stylus or glove)) in proximity to a user-interfaceable surface of the HDD 226. The touchscreen primary sensor 402 is configured to output data (e.g., touch location information as signals or a change in electrical properties) to a controller (e.g., touchscreen controller) of the HDD 226, a processor of the HDD 226, or another computing device 112.

The adhesive layer 404 may include a transparent adhesive positioned between the display element 406 and the touchscreen primary sensor 402. The adhesive layer 404 may bond the display element 406 to a substrate of the touchscreen primary sensor 402. In some embodiments, the adhesive layer 404 may be omitted. Additionally, while FIG. 4 shows the display element 406 and the touchscreen primary sensor 402 as being separate elements, in other embodiments the touchscreen primary sensor 402 and the display element 406 may be implemented as a single element or in a single substrate; for example, a display element may be implemented in a substrate that also includes piezoelectric touchscreen sensors within the substrate. Some embodiments may include other adhesive layers, such as an adhesive layer bonding a bottom surface of the display element 406 to the array 408 of ultrasonic transducers 242.

The display element 406 may be implemented as display element configured to emit or impart an image for presentation to a user. The display element 406 may be implemented as a transmissive display element or an emissive display element, as well as other types of display elements. For example, where the display element 406 is implemented as a transmissive display element, the display element 406 may be implemented as a liquid crystal display (LCD) element. For example, where the display element 406 is implemented as an emissive display element, the display element 406 may be implemented as a quantum dot light-emitting diode (QLED) display element, a micro-LED display element, or an organic light-emitting diode (OLED) display element, such as active-matrix OLEDs (AMO-LEDs), passive-matrix OLEDs (PMOLEDs), light-emitting electrochemical cells (LECs), or the like.

The array 408 of ultrasonic transducers 242 may be implemented behind the touchscreen primary sensor 402, the adhesive layer 404, and the display element 406. The array 408 of ultrasonic transducers 242 may be configured to emit ultrasonic waves through the touchscreen primary sensor 402, the adhesive layer 404, and/or the display element 406. The array 408 of ultrasonic transducers 242 may be configured to form an ultrasonic acoustic field perceivable by the pilot.

Figure 9:
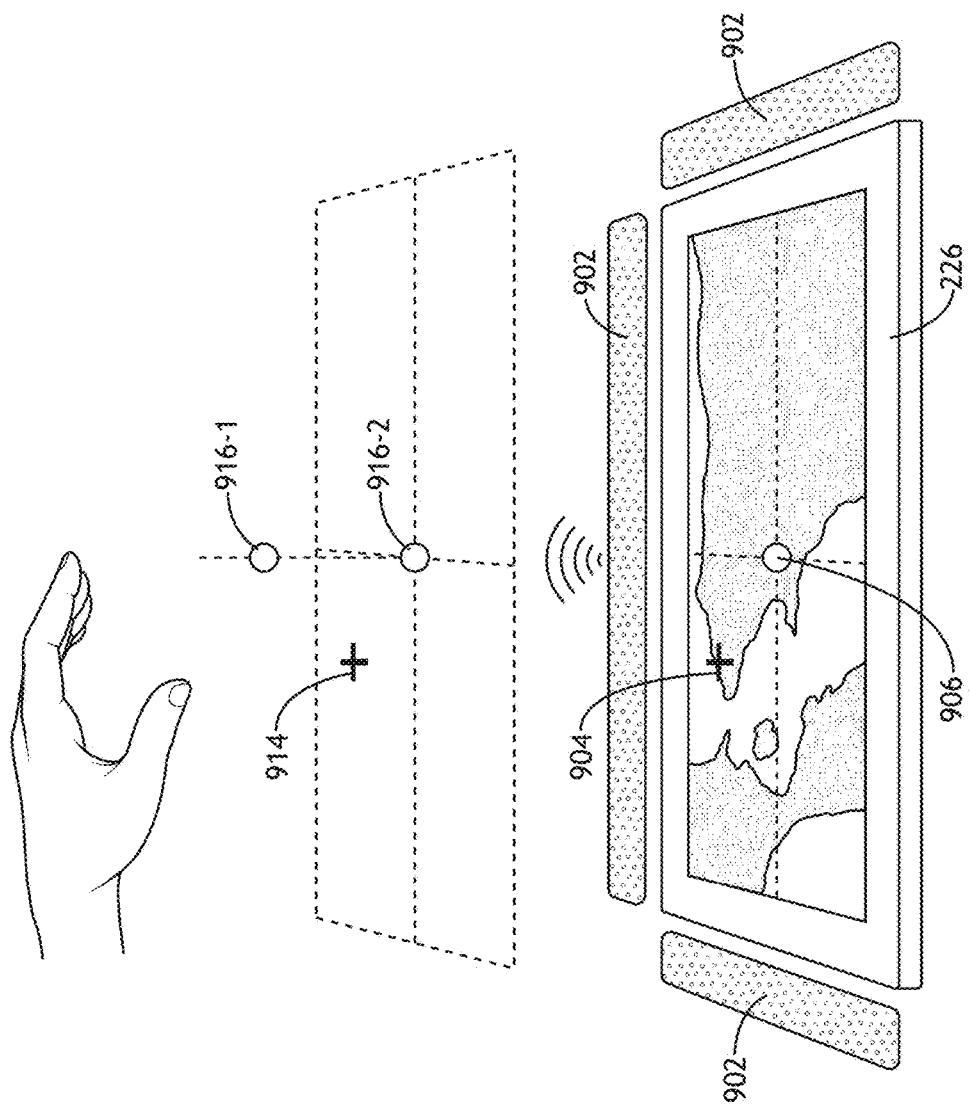
FIG. 9 is a view of the head down display of FIG. 2 according to the inventive concepts disclosed herein.

While FIG. 4 exemplarily depicts the HDD 226 as a haptic feedback touchscreen display system, in some embodiments, the system 100 may include any suitable displays implemented as haptic feedback touchscreen display systems. For example, the AFDs 204 may be implemented as haptic feedback touchscreen display systems. Further, while FIG. 4 exemplarily depicts the plurality of ultrasonic transducers 242 of the HDD 226 as the array 408 of ultrasonic transducers 242 located beneath the display element 406, in some embodiments the plurality of ultrasonic transducers 242 may be located elsewhere and/or in different arrangements; for example, FIG. 9 depicts the plurality of ultrasonic transducers 242 as a plurality of bars 902 of ultrasonic transducers 242 positioned around the perimeter of the HDD 226.

Figure 5:
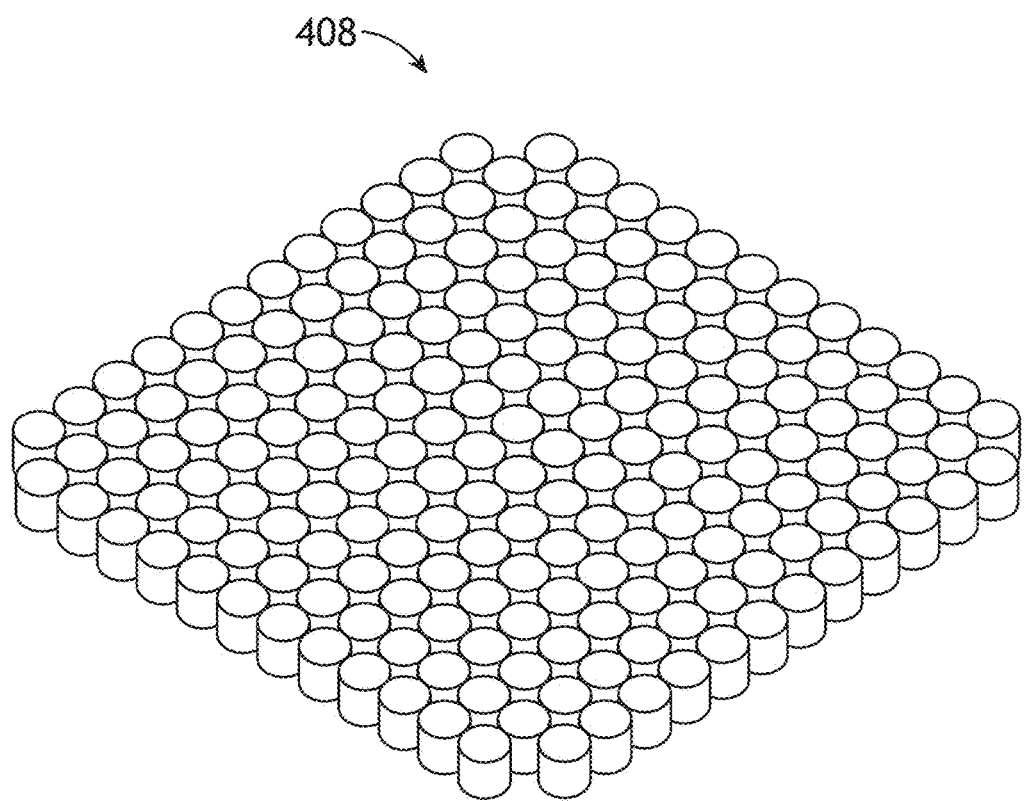
FIG. 5 is a view of an array of ultrasonic transducers of the head down display of FIG. 4 according to the inventive concepts disclosed herein.

Referring now to FIG. 5, the array 408 of ultrasonic transducers 242 of the HDD 226 of FIG. 4 is shown. For example, the array 408 of ultrasonic transducers 242 may be implemented as a two-dimensional array of any suitable number of columns and rows of ultrasonic transducers 242. While the array 408 of ultrasonic transducers 242 may be implemented as shown in FIG. 5, in some embodiments, the plurality of ultrasonic transducers 242 may be implemented as one or more three-dimensional surfaces (e.g., a curved surface), implemented as a plurality of non-coplanar two-dimensional arrays, or a combination thereof.

Figure 6:
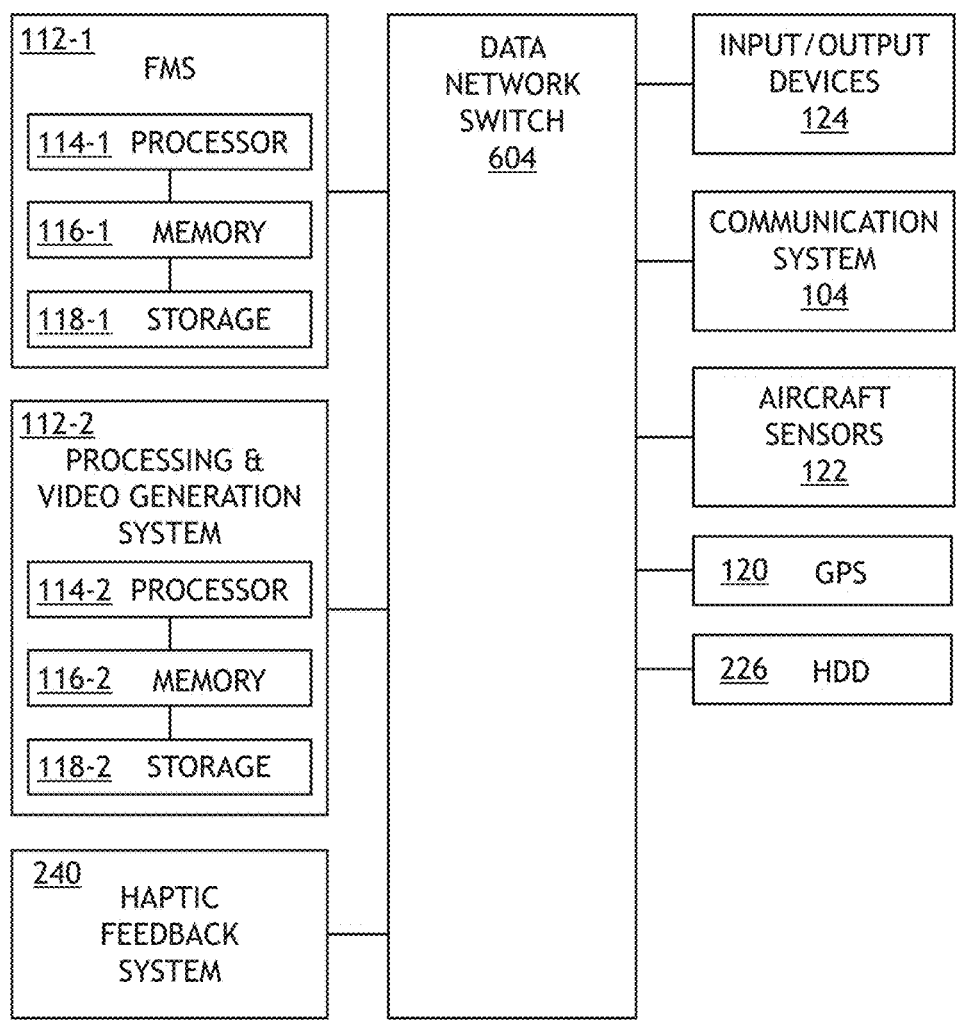
FIG. 6 is a view of exemplary devices of the aircraft of FIG. 1 communicatively coupled via a data network switch of an exemplary embodiment according to the inventive concepts disclosed herein.

Referring now to FIG. 6, various exemplary devices of the aircraft 102 of FIG. 1 communicatively coupled via a data network switch 604 (e.g., an avionics full-duplex Ethernet (AFDX) switch) are shown. For example, a plurality of computing devices 112, the input/output devices 124, the communication system 104, the aircraft sensors 122, and the GPS device 120 may be communicatively coupled via the data network switch 604. While the plurality of computing devices 112, the input/output devices 124, the communication system 104, the aircraft sensors 122, and the GPS device 120 are exemplarily shown as being communicatively coupled via the data network switch 604, in some embodiments some or all of the plurality of computing devices 112, the input/output devices 124, the communication system 104, the aircraft sensors 122, and the GPS device 120 may be communicatively coupled via any suitable data networks and via any suitable data networking components (e.g., at least one bus (e.g., Aeronautical Radio, Incorporated (ARINC) 429 busses), at least one data concentrator, at least one switch, at least one router, or a combination thereof).

The plurality of computing devices 112 may be implemented as and/or include a plurality of avionics computing devices (e.g., which may be implemented in one or more integrated modular avionics (IMA) cabinets). The plurality of avionics computing devices may include an FMS computing device 112-1 and a processing and video generation system computing device 112-2. Additionally, the input/output devices 124, the communication system 104, the aircraft sensors 122, the data network switch 604, and the GPS device 120 may be considered to be devices of the plurality of avionics computing devices and may be implemented similarly as and function similarly as avionics devices (e.g., 112-1, 112-2) as disclosed throughout. Each of the plurality of avionics computing devices (e.g., 112-1, 112-2) may include components, which may be implemented and function similarly as the components of the computing device 112 shown and described with respect to FIG. 1. As such, each of the plurality of avionics computing devices may include at least one processor, memory, and storage, which may be implemented and function similarly as the processor 114, the memory 116, and the storage 118, respectively, of the computing device 112 shown and described with respect to FIG. 1. For example, the FMS computing device 112-1 may include a processor 114-1, memory 116-1, and storage 118-1, which may be implemented and function similarly as the processor 114, the memory 116, and the storage 118, respectively, of the computing device 112 shown and described with respect to FIG. 1. Additionally, for example, the processing and video generation system computing device 112-2 may include a processor 114-2, memory 116-2, and storage 118-2, which may be implemented and function similarly as the processor 114, the memory 116, and the storage 118, respectively, of the computing device 112 shown and described with respect to FIG. 1.

The plurality of avionics computing devices (e.g., 112-1, 112-2) and/or processors thereof (e.g., 114-1, 114-2) may be implemented as special purpose computers (e.g., the FMS computing device 112-1 and/or the processing and video generation system computing device 112-2) and/or special purpose processors (e.g., the processor 114-1 of the FMS computing device 112-1 programmed to execute instructions for performing FMS operations as disclosed throughout and/or the processor 114-2 of the processing and video generation system computing device 112-2 programmed to execute instructions for performing processing and video generation operations as disclosed throughout) configured to execute instructions for performing any or all of the operations disclosed throughout.

The FMS computing device 112-1 may be configured to automate various in-flight tasks, such as managing a flight plan of the aircraft 102. The processor 114-1 of the FMS computing device 112-1 may be configured to perform any of various, suitable operations, which are commonly performed by FMSs, as would be appreciated by those skilled in the art. In addition to performing commonly performed operations, some embodiments include the processor 114-1 of the FMS computing device 112-1 being configured (e.g., programmed) to perform additional operations.

For example, the FMS computing device 112-1 may be configured to receive aircraft sensor data (e.g., data associated with aircraft location and orientation, attitude, and/or airspeed data) from one or more of the aircraft sensors 122, access flight plan data (e.g., data associated with a flight plan and which may include data corresponding to waypoints of a flight plan) maintained within the memory 116-1, access map data (e.g., flight map data), and output FMS data based thereon to one or more of the input/output devices 124 (e.g., the HDD 226 and/or the haptic feedback system 240), the communication system 104, and/or the processing and video generation system 112-2. For example, the FMS data may include the aircraft sensor data, data associated with at least one determined aircraft state, the flight plan data, the map data, and flight path data. In addition to performing commonly performed operations, some embodiments include the processor 114-1 of the FMS computing device 112-1 being configured (e.g., programmed) to perform additional operations as disclosed throughout.

For example, the processor 114-1 may be configured to generate a three-dimensional flight path from a position and orientation of the aircraft 102 to a waypoint of a flight plan. The processor 114-1 may be configured to output the generated flight path as the flight path data to one or more of the input/output devices 124 (e.g., the HDD 226 and/or the haptic feedback system 240), the communication system 104, and/or the processing and video generation system 112-2, and/or a different onboard or off-board computing device.

In some embodiments, the processor 114-1 may be configured to determine (e.g., by receiving data from the aircraft sensors 122) at least one aircraft state (e.g., position, orientation, and/or detected trajectory) of the aircraft 102 in real time. The processor 114-1 may be configured to output (e.g., constantly output or frequently output) data associated with the at least one determined aircraft state of the aircraft 102 to one or more of the input/output devices 124 (e.g., the HDD 226 and/or the haptic feedback system 240), communication system 104, the processing and video generation system 112-2, and/or a different onboard or off-board computing device for use in presenting (e.g., graphically, audibly, and/or via an ultrasonic acoustic field) such information to the pilot of the aircraft 102. The processor 114-1 may also be configured to compare (e.g., iteratively compare or constantly compare) the at least one determined aircraft state of the aircraft 102 against a flight plan and/or a generated flight path. By comparing the at least one determined aircraft state of the aircraft 102 against the flight plan and/or generated flight path, the processor 114-1 may be configured to determine at least one deviation (e.g., a lateral position deviation, a vertical position deviation, an airspeed deviation (e.g., a vertical descent rate deviation, a lateral airspeed deviation), an orientation deviation, or a combination thereof) of the aircraft 102 from the flight plan and/or generated flight path. The processor 114-1 may be configured to output data associated with the at least one deviation to one or more of the input/output devices 124 (e.g., the HDD 226 and/or the haptic feedback system 240), the communication system 104, the processing and video generation system 112-2, and/or a different onboard or off-board computing device.

In some embodiments, the processor 114-1 of the FMS computing device 112-1 may be configured to perform functionality of the processing and video generation system computing device 112-2 and/or the haptic feedback system 240 as described throughout. For example, the FMS computing device 112-1 may include an integrated processing and video generation system and/or a haptic feedback system, and the FMS computing device 112-1 may be programmed to perform functionality of the processing and video generation system computing device 112-2 and the haptic feedback system 240 as described throughout. In such embodiments, the processing and video generation system computing device 112-2 and/or the haptic feedback system 240 may be optional.

The FMS computing device 112-1 may include software, code, and/or processor-executable instructions stored (e.g., maintained) in a non-transitory computer-readable medium (e.g., the memory 116-1 and/or storage 118-1). By executing the software, code, and/or processor-executable instructions, the processor 114-1 may be configured to perform any of various FMS operations according to inventive concepts as disclosed throughout.

The processing and video generation system computing device 112-2 may be configured to receive data from any of various onboard or off-board devices. For example, the processing and video generation system computing device 112-2 may be configured to receive FMS data (e.g., the aircraft sensor data, data associated with at least one determined aircraft state, the flight plan data, the map data, and/or flight path data). Additionally, for example, the processing and video generation system computing device 112-2 may be configured to exchange (e.g., send and/or receive) data with one or more of the input/output devices 124 (e.g., HDD 226 and the haptic feedback system 240), the communication system 104, the aircraft sensors 122, and the GPS 120.

The processing and video generation system computing device 112-2 may be configured to process data received from any of various computing devices (e.g., the FMS computing device 112-1) and to output data (e.g., video data, haptic feedback data, and/or audio data) to any of various devices (e.g., the input/output devices 124). For example, the processor 114-2 of the processing and video generation system computing device 112-2 may be configured to receive the FMS data (e.g., the aircraft sensor data, data associated with at least one determined aircraft state, the flight plan data, the map data, and/or flight path data) from the FMS computing device 112-1. For example, based at least in part on the received FMS data, the processor 114-2 of the processing and video generation system computing device 112-2 may be configured to generate graphical data to output to one or more of the displays (e.g., HUDs 202, AFDs 204, and/or HDD 226) and/or other of the input/output devices 124 and may be configured to generate haptic feedback data to output to the haptic feedback system 240. The processor 114-2 may be configured to synchronously generate the graphical data and the haptic feedback data such that an ultrasonic acoustic field to be generated by the haptic feedback system 240 corresponds (e.g., corresponds in space and time) to graphics to be displayed by one or more of the displays (e.g., HDD 226). For example, synchronous graphical data and haptic feedback data results in one or more pressure pattern regions of the ultrasonic acoustic field being appropriately positioned relative to corresponding displayed graphical regions at the appropriate time.

In some embodiments, the processor 114-2 may be configured to receive the data associated with the at least one determined aircraft state of the aircraft 102 from the FMS system computing device 112-1 for use in presenting (e.g., graphically, audibly, and/or via an ultrasonic acoustic field) such information to the pilot of the aircraft 102. Additionally, the processor 114-2 may be configured to receive data associated with the at least one deviation from the FMS computing device 112-1 and/or a different onboard or off-board computing device. For example, if a deviation exceeds a predetermined threshold deviation, the processor 114-2 may be configured to generate alert data. For example, the processor 114-2 may be configured to output graphical alert data to one or more of the displays (e.g., the HDD 226) configured to alert a pilot. Additionally, for example, the processor 114-2 may be configured to output haptic feedback alert data to the haptic feedback system 240 configured to alert a pilot. The haptic feedback alert data may be output to the haptic feedback system 240 as part or all of the haptic feedback data.

In some embodiments, the processor 114-2 may be configured to receive user feedback data (e.g., data associated with user feedback), such as alert acknowledgement data (e.g., data associated with a user acknowledging an alert) and/or alert dismissal data (e.g., data associated with a user dismissing an alert), from an input/output device (e.g., the HDD 226 implemented as a touchscreen display, the gesture recognition system 228, or another input device of the input/output devices 124). In response to receiving the user feedback data, the processor 114-2 may be configured to cease outputting alert data (e.g., the graphical alert data and/or the haptic feedback alert data). For example, haptic feedback alert data may be associated with particular aircraft operating conditions (e.g., deviation from a flight plan, excessive roll, imminent aircraft stall, excessive or insufficient speed, excessive or insufficient ascent, excessive or insufficient descent, and/or excessive or insufficient altitude), particular weather conditions (e.g., turbulence and/or precipitation), and/or map items (e.g., other aircraft, restricted air space 1402, weather event 1404, waypoints, and/runways) relative to a displayed map.

In some embodiments, the processing and video generation system computing device 112-2 may be configured to provide user-manipulatable region data to the gesture recognition system 228 such that the gesture recognition system 228 is configured to determine whether a user is performing a gesture with respect to a user-manipulatable region, which, for example may contain an ultrasonic cursor representation (e.g., 914 as shown in FIG. 9). The user-manipulatable region data may correspond to user-manipulatable regions of the ultrasonic acoustic field. For example, the user-manipulatable region data may include information of a location(s) of various user-manipulatable points or objects of the ultrasonic acoustic field, such as an ultrasonic cursor representation (e.g., 914 as shown in FIG. 9). The user may interact with various user-manipulatable points or objects of the ultrasonic acoustic field. Based on the user-manipulatable region data, the gesture recognition system may be configured to detect the user's manipulation of the user-manipulatable points or objects and to output gesture recognition data (e.g., corresponding to the user's manipulation of the user-manipulatable points or objects) to another computing device, such as the processing and video generation system computing device 112-2, such that the user manipulation can be synchronized with graphical images to be displayed.

In some embodiments, the processing and video generation system computing device 112-2 may be configured to perform synthetic vision system (SVS) functionality, for example, by utilizing synthetic image data to construct real-time synthetic views of the environment (e.g., the world outside of the aircraft) based at least on the at least one determined aircraft state relative to the earth. For example, the processor 114-2 may be configured to perform SVS operations so as to improve pilot's ability to safely fly and/or land the aircraft 102 in a degraded visual environment, such as rain, fog, darkness, smoke, snow, or dust, where the pilot might not be able to perceive the surrounding environment without synthetic views. In some embodiments, the processor 114-2 may be configured to output synchronous haptic feedback data such that an ultrasonic acoustic field to be generated by the haptic feedback system 240 corresponds (e.g., corresponds in space and time) to synthetic images displayed by one or more of the displays (e.g., HDD 226). For example, an ultrasonic acoustic field to be generated by the haptic feedback system 240 may include pressure regions corresponding to topological features (e.g., peaks, valleys, and/or a runway).

In some embodiments, the processor 114-2 of the processing and video generation system computing device 112-2 may be configured to perform functionality of the FMS computing device 112-1 and/or the haptic feedback system as described throughout. For example, the processing and video generation system computing device 112-2 may include an integrated FMS and haptic feedback system, and the processing and video generation system computing device 112-2 may be programmed to perform functionality of the FMS computing device 112-1 and the haptic feedback system 240 as described throughout. In such embodiments, a dedicated FMS computing device and/or a dedicated haptic feedback system 240 may be optional.

Additionally, the processor 114-2 may be configured to perform any of various, suitable operations, which are commonly performed by video processing and/or audio processing computing devices, as would be appreciated by those skilled in the art. In addition to performing commonly performed operations, some embodiments include the processor 114-2 being configured (e.g., programmed) to perform additional operations as disclosed throughout.

The processing and video generation system computing device 112-2 may include software, code, and/or processor-executable instructions stored (e.g., maintained) in a non-transitory computer-readable medium (e.g., the memory 116-2 and/or storage 118-2). By executing the software, code, and/or processor-executable instructions, the processor 114-2 may be configured to perform any of various operations according to inventive concepts as disclosed throughout.

The haptic feedback system 240 may be configured to receive FMS data from the FMS computing device 112-1 and/or haptic feedback data from the processing and video generation system 112-1. In response to receiving the FMS data and/or the haptic feedback data, the haptic feedback system 240 may be configured to form an ultrasonic acoustic field, which may be felt by the pilot as tactile sensations.

While the FMS computing device 112-1, the processing and video generation computing device 112-2, and the haptic feedback system 240 have been exemplarily depicted as being implemented as separate avionics computing devices, in some embodiments, some or all of the FMS computing device 112-1, the processing and video generation computing device 112-2, and the haptic feedback system 240 may be implemented as a single integrated computing device or as any number of integrated and/or partially integrated computing devices.

Additionally, in some embodiments, the data network switch 604 may be implemented similarly as and function similarly to one of the avionics computing devices (e.g., 112-1 and/or 112-2) or include components that function similarly to components of one of the avionics computing devices. For example, the data network switch 604 may include an integrated computing device (which may be implemented and function similarly to one of the computing devices 112 (e.g., one of the avionics computing devices (e.g., 112-1 and/or 112-2)) and/or integrated computing device components (which may be implemented and function similarly to components of one of the computing devices 112 of FIG. 1).

Further, while the plurality of avionics computing devices has been exemplarily depicted and described with respect to FIG. 6 as including the FMS computing device 112-1, the processing and video generation computing device 112-2, and the haptic feedback system 240, in some embodiments, the plurality of avionics computing devices may omit one or more of the described and depicted avionics computing devices, include additional numbers of such avionics computing devices, and/or include other types of suitable avionics computing devices.

Figure 7:
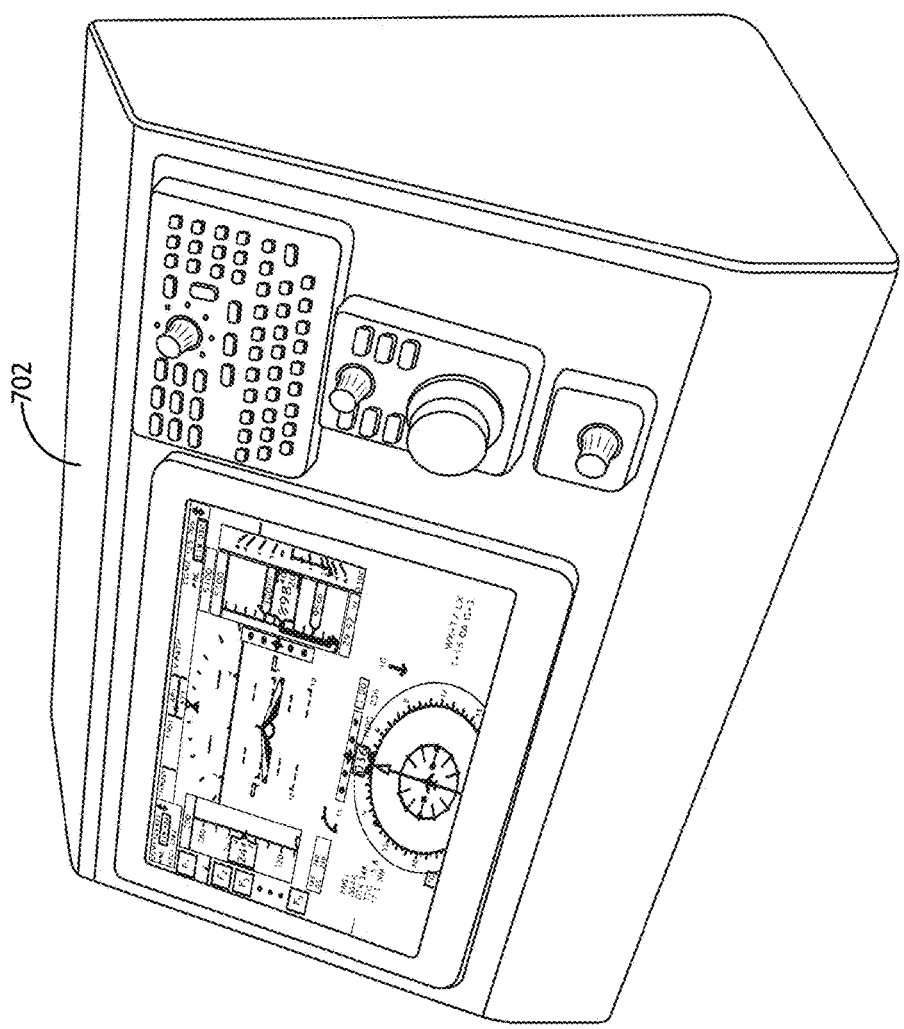
FIG. 7 is an view of an adaptive flight display implemented in a control station according to the inventive concepts disclosed herein.

Referring now to FIG. 7, an AFD 702 implemented in the control station 126 (e.g., a ground control station) according to the inventive concepts disclosed herein is shown. The AFD 702 may be configured to perform functionality analogous to and include components analogous to the FMS computing device 112-1, the processing and video generation system 112-2, the HDD 226, and the haptic feedback system 240 of the aircraft 102. The AFD 702 may be configured for remotely operating and/or remotely monitoring the aircraft 102. The AFD 702 may be configured to provide haptic feedback to a remote operator and/or remote monitor via ultrasonic transducers implemented similarly to the ultrasonic transducers 242. The haptic feedback from the AFD 702 may provide a more tightly coupled user interface between the remote operator and the remotely operated aircraft.

Figure 8:
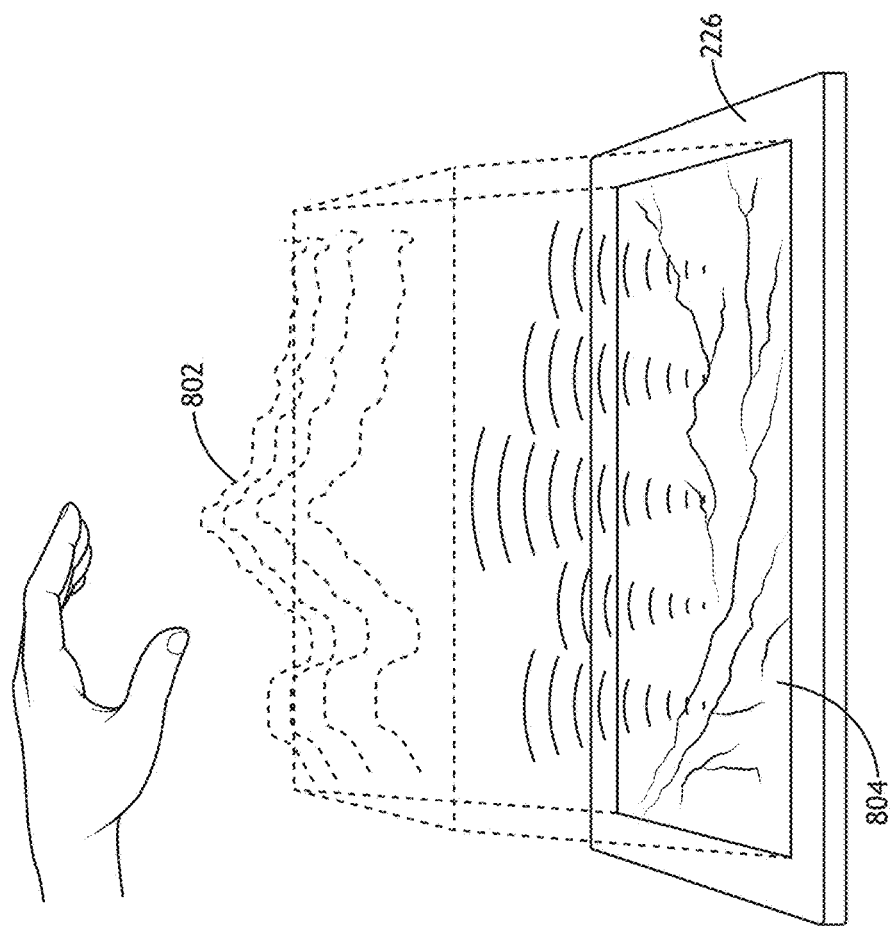
FIG. 8 is a view of the head down display of FIG. 2 presenting an image of terrain and a three-dimensional ultrasonic acoustic field representation of the terrain according to the inventive concepts disclosed herein.

Referring now to FIG. 8, an exemplary view of the HDD 226 according to the inventive concepts disclosed herein is shown. The HDD 226 may include the haptic feedback system 240 and may be implemented with ultrasonic transducers 242 beneath a screen of the HDD 226. As shown, the HDD 226 is configured to present an image 804 of terrain and a three-dimensional ultrasonic acoustic field representation 802 of the terrain. The ultrasonic acoustic field representation 802 of the terrain may be formed as three-dimensional surface in a spatial region in front of the display area of the HDD 226. Peaks and valleys of the ultrasonic acoustic field representation 802 of the terrain may correspond to peaks and valleys, respectively, of the image 804 of the terrain. Peaks of the ultrasonic acoustic field representation 802 may be located further away from a display surface of the HDD 226 than valleys of the ultrasonic acoustic field representation 802. The ultrasonic acoustic field representation 802 allows the pilot to feel the topology of the terrain as tactile sensations caused by pressure patterns formed by the ultrasonic transducers 242.

For example, the processor 114-2 of the processing and video generation system computing device 112-2 may be configured to receive map data from the FMS computing device 112-1. Based at least in part on the received map data, the processor 114-2 of the processing and video generation system computing device 112-2 may be configured to generate graphical data corresponding to the image 804 of terrain to output to the HDD 226 and may be configured to generate haptic feedback data corresponding to the ultrasonic acoustic field representation 802 of the terrain to output to the haptic feedback system 240 of the HDD 226.

As a map of the terrain is zoomed in/out and/or panned to one side, the processor 114-2 of the processing and video generation system 112-2 may be configured to synchronously generate updated graphical data to be displayed by the HDD 226 and updated haptic feedback data to be presented by the haptic feedback system 240 such that an updated ultrasonic acoustic field representation of terrain continues to correspond to an updated image of the terrain being displayed by the HDD 226.

In some embodiments, the gesture recognition system 228 is configured to detect user gestures as user inputs to interact with the ultrasonic acoustic field representation of the terrain. For example, the gesture recognition system 228 may be configured to detect a user's selection of a point in the ultrasonic acoustic field representation 802 of the terrain. In some embodiments, the gesture recognition system 228 is configured to detect user gestures as user inputs to manipulate (e.g., pan, rotate, zoom in, and/or zoom out) the image 804 of terrain and/or the ultrasonic acoustic field representation of the terrain.

Referring now to FIG. 9, an exemplary view of the HDD 226 according to the inventive concepts disclosed herein is shown. The HDD 226 may include the haptic feedback system 240 and may be implemented with bars 902 of ultrasonic transducers 242 positioned along one or more sides (e.g., one, two, three (as shown), or four) of the HDD 226. Additionally, the HDD 226 may be implemented with ultrasonic transducers 242 beneath a screen of the HDD 226.

As shown, the HDD 226 is configured to present an image (e.g., a map) including a cursor 904 and at least one image reference point 906 (e.g., an image center). The bars 902 of ultrasonic transducers 242 may be configured to form a three-dimensional ultrasonic acoustic field in a spatial region in front of the display area of the HDD 226. The ultrasonic acoustic field may include an ultrasonic cursor representation 914 and at least one ultrasonic reference point (e.g., 916-1 and/or 916-2). The ultrasonic cursor representation 914 may synchronously correspond to the cursor 904, and each of the at least one ultrasonic reference point (e.g., 916-1 and/or 916-2) may synchronously correspond to a particular image reference point (e.g., 906). Each of the ultrasonic cursor representation 914 and the ultrasonic reference points (e.g., 916-1 and/or 916-2) may have distinct pressure patterns such that the ultrasonic cursor representation 914 and the ultrasonic reference points (e.g., 916-1 and/or 916-2) are distinguishable to a pilot based on different tactile sensations.

Each of the ultrasonic reference points (e.g., 916-1 and/or 916-2) provides a pilot with a reference point of where the pilot's hand is located. For example, the ultrasonic reference points 916-1, 916-2 may be located along a central axis passing through an image center of the HDD 226. As such, the ultrasonic reference points 916-1, 916-2 may indicate to the pilot that the pilot's hand is positioned along the central axis passing through the center of the HDD 226. For example, the ultrasonic reference points 916-1, 916-2 may be configured to allow a pilot to spatially localize the pilot's hand with respect to the ultrasonic reference points 916-1, 916-2. For example, the ultrasonic reference points 916-1, 916-2 may allow the pilot to find the center of the display based only on tactile sensations caused by an ultrasonic reference point (e.g., 916-1 and/or 916-2). Additionally, allowing the pilot to find the center of the display based only on tactile sensations may be useful for centering the pilot's hand for gestures to be detected by the gesture recognition system 228.

While the ultrasonic reference points 916-1, 916-2 are exemplarily depicted as being located along a central axis passing through a center of the HDD 226, some embodiments may include any number of ultrasonic reference points positioned at any suitable locations. For example, ultrasonic reference points may be positioned at reference locations corresponding to corners of the display.

In some embodiments, the pilot may interact with the ultrasonic cursor representation 914, and the gesture recognition system 228 may detect the pilot's interaction with the ultrasonic cursor representation 914. For example, based at least on user-manipulatable region data (e.g. indicative of a spatial location of the ultrasonic cursor representation 914) received from the processing and video generation system computing device 112-2, the gesture recognition system 228 may be configured to determine that the pilot is manipulating (e.g., moving) the ultrasonic cursor representation 914 and to output gesture recognition data (e.g., corresponding to the user's manipulation of the ultrasonic cursor representation 914) to another computing device, such as the processing and video generation system computing device 112-2, such that the pilot's manipulation of the ultrasonic cursor representation 914 can be synchronized with a position of the displayed cursor 904 and a position of the ultrasonic cursor representation 914 as the pilot manipulates the ultrasonic cursor representation 914. For example, when the gesture recognition system 228 outputs gesture recognition data indicative of the pilot manipulating the ultrasonic cursor representation 914 to the processing and video generation system computing device 112-2, the processing and video generation system computing device 112-2 may be configured to update the graphical data with the updated cursor location to be displayed by the HDD 226 and update the haptic feedback data configured to cause the formation of the ultrasonic acoustic field with an updated ultrasonic cursor representation location.

Referring now to FIGS. 10A-12C, exemplary views of user gestures with ultrasonic haptic feedback relative to the HDD 226 according to the inventive concepts disclosed herein are shown. For example, the gesture recognition system 228 may be configured to recognize any of various flight control gestures as a user input to perform a particular flight control maneuver, and in response, the ultrasonic transducers 242 may be configured to form a particular predetermined ultrasonic acoustic field indicative to a trained pilot that the particular flight control maneuver is being performed. While FIGS. 10A-12C exemplarily depict the HDD 226, other embodiments may be implemented with any suitable display, such as the AFD 702 implemented in the control station 126. For example, a remote control and/or remote monitor AFD 702 configured with ultrasonic haptic feedback may more accurately simulate an in-cockpit experience as compared to an AFD lacking ultrasonic haptic feedback. For example, ultrasonic haptic feedback may provide remote operators and/or remote monitors of the aircraft 102 with augmented sensations of aircraft conditions, such as turbulence or impending stall.

Figure 10A:
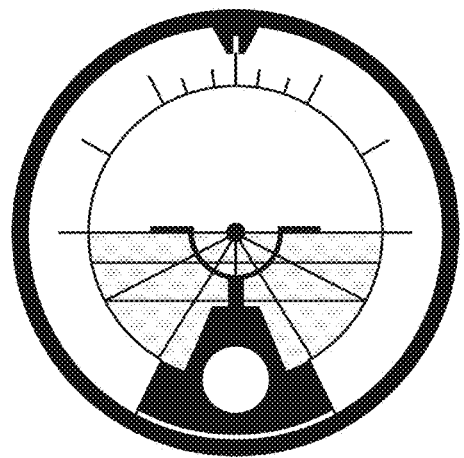
FIG. 10A is a partial view of the head down display of FIG. 2 according to the inventive concepts disclosed herein.
Figure 10B:
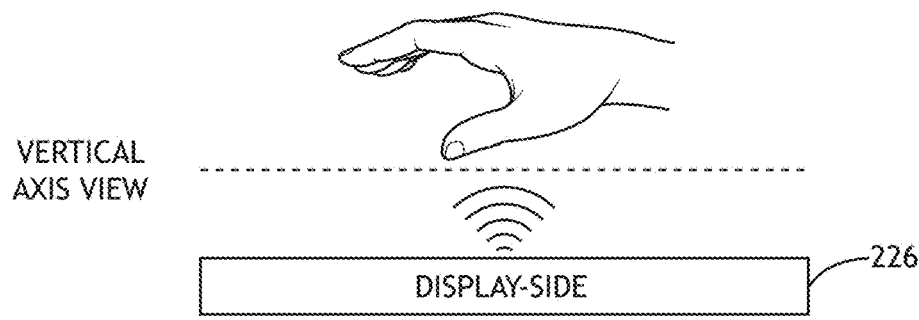
FIG. 10B is a vertical axis view of a pilot performing a level flight maneuver gesture relative to the head down display of FIG. 2 with ultrasonic haptic feedback according to the inventive concepts disclosed herein.
Figure 10C:
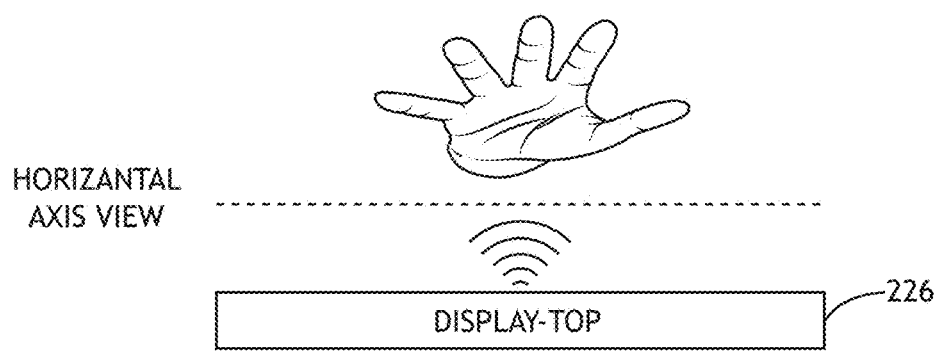
FIG. 10C is a horizontal axis view of a pilot performing a level flight maneuver gesture relative to the head down display of FIG. 2 with ultrasonic haptic feedback according to the inventive concepts disclosed herein.

Referring now to FIG. 10A, a partial view of the HDD 226 depicting a flight indicator with a level flight maneuver is shown. Referring now to FIG. 10B, a vertical axis view of the pilot performing a level flight maneuver gesture relative to the HDD 226 with ultrasonic haptic feedback is shown. Referring now to FIG. 10C, a horizontal axis view of the pilot performing the level flight maneuver gesture relative to the HDD 226 with ultrasonic haptic feedback is shown. For example, with respect to FIGS. 10B and 10C, the gesture recognition system 228 may recognize the pilot's gesture as a gesture to perform a level flight maneuver, and in response, the ultrasonic transducers 242 may be configured to form a particular predetermined ultrasonic acoustic field indicative to a trained pilot that the aircraft 102 is in level flight.

Figure 11A:
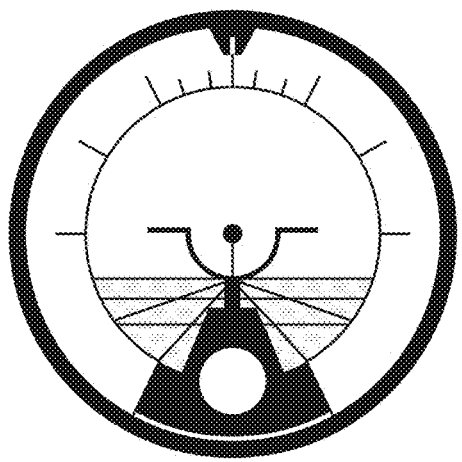
FIG. 11A is a partial view of the head down display of FIG. 2 according to the inventive concepts disclosed herein.
Figure 11B:
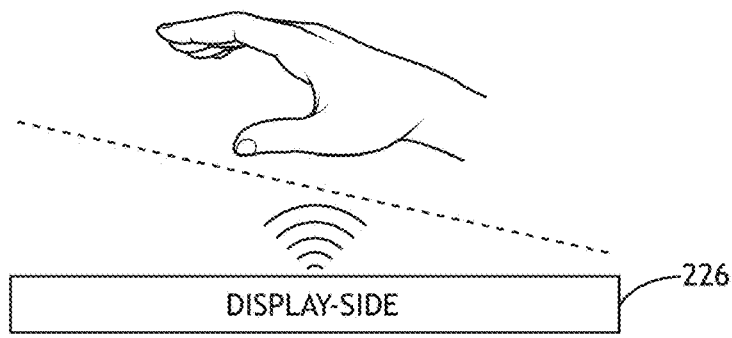
FIG. 11B is a vertical axis view of a pilot performing a climb maneuver gesture relative to the head down display of FIG. 2 with ultrasonic haptic feedback according to the inventive concepts disclosed herein.
Figure 11C:
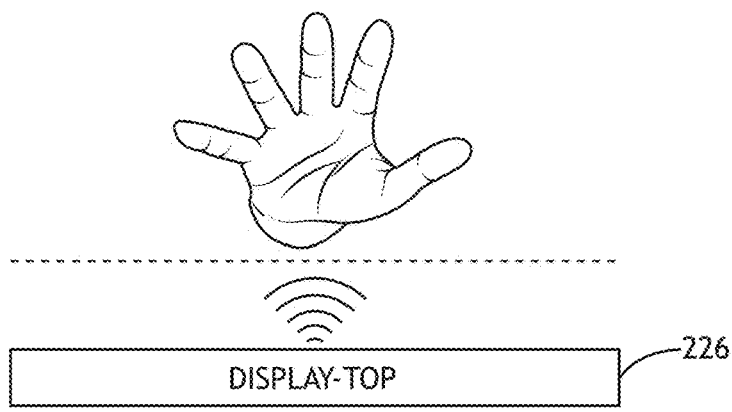
FIG. 11C is a horizontal axis view of a pilot performing a climb maneuver gesture relative to the head down display of FIG. 2 with ultrasonic haptic feedback according to the inventive concepts disclosed herein.

Referring now to FIG. 11A, a partial view of the HDD 226 depicting a flight indicator with a climb maneuver is shown. Referring now to FIG. 11B, a vertical axis view of the pilot performing a climb maneuver gesture relative to the HDD 226 with ultrasonic haptic feedback is shown. Referring now to FIG. 11C, a horizontal axis view of the pilot performing the climb maneuver gesture relative to the HDD 226 with ultrasonic haptic feedback is shown. For example, with respect to FIGS. 11B and 11C, the gesture recognition system 228 may recognize the pilot's gesture as a gesture to perform a climb flight maneuver, and in response, the ultrasonic transducers 242 may be configured to form a particular predetermined ultrasonic acoustic field indicative to a trained pilot that the aircraft 102 is in a climb maneuver. Additionally, for example, if a processor (e.g., 112, 112-1, and/or 112-2) of the aircraft 102 determines that a stall is imminent during the climb maneuver, the processor may output haptic feedback alert data to the haptic feedback system 240 causing the ultrasonic transducers 242 to form a particular predetermined ultrasonic acoustic field indicative to a trained pilot that a stall is imminent. For example, the particular predetermined ultrasonic acoustic field indicative of the impending stall may be implemented with pressure pulsing configured to alert the pilot.

Figure 12A:
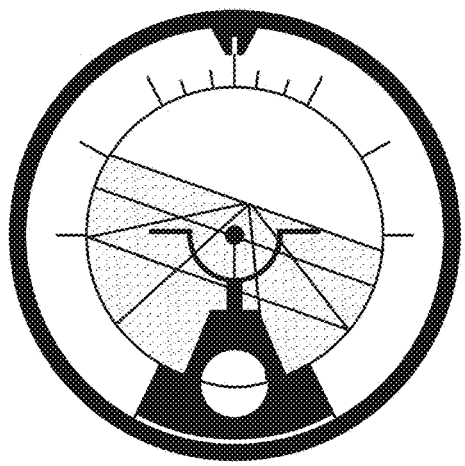
FIG. 12A is a partial view of the head down display of FIG. 2 according to the inventive concepts disclosed herein.
Figure 12B:
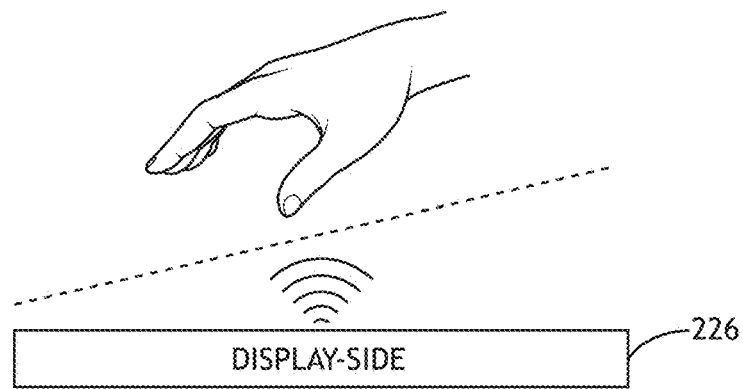
FIG. 12B is a vertical axis view of a pilot performing a descending left turn maneuver gesture relative to the head down display of FIG. 2 with ultrasonic haptic feedback according to the inventive concepts disclosed herein.
Figure 12C:
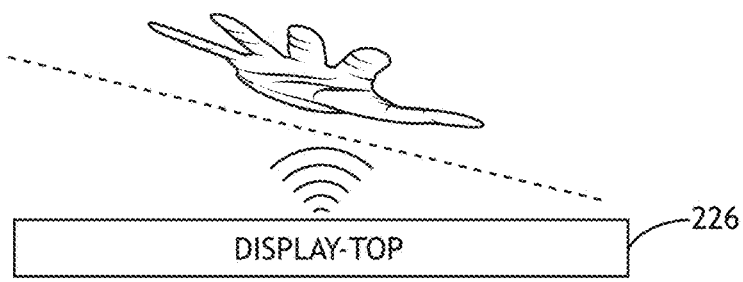
FIG. 12C is a horizontal axis view of a pilot performing a descending left turn maneuver gesture relative to the head down display of FIG. 2 with ultrasonic haptic feedback according to the inventive concepts disclosed herein.

Referring now to FIG. 12A, a partial view of the HDD 226 depicting a flight indicator with a descending left turn maneuver is shown. Referring now to FIG. 12B, a vertical axis view of the pilot performing a descending left turn maneuver gesture relative to the HDD 226 with ultrasonic haptic feedback is shown. Referring now to FIG. 12C, a horizontal axis view of the pilot performing the descending left turn maneuver gesture relative to the HDD 226 with ultrasonic haptic feedback is shown. For example, with respect to FIGS. 12B and 12C, the gesture recognition system 228 may recognize the pilot's gesture as a gesture to perform a descending left turn maneuver, and in response, the ultrasonic transducers 242 may be configured to form a particular predetermined ultrasonic acoustic field indicative to a trained pilot that the aircraft 102 is in a descending maneuver and left turn maneuver.

With respect to the flight maneuver gestures depicted in FIGS. 10A-12C, each flight maneuver may have a distinguishable ultrasonic acoustic field from those of other flight maneuvers, such as based on a location of pressure patterns and intensity of pressure patterns.

Figure 13:
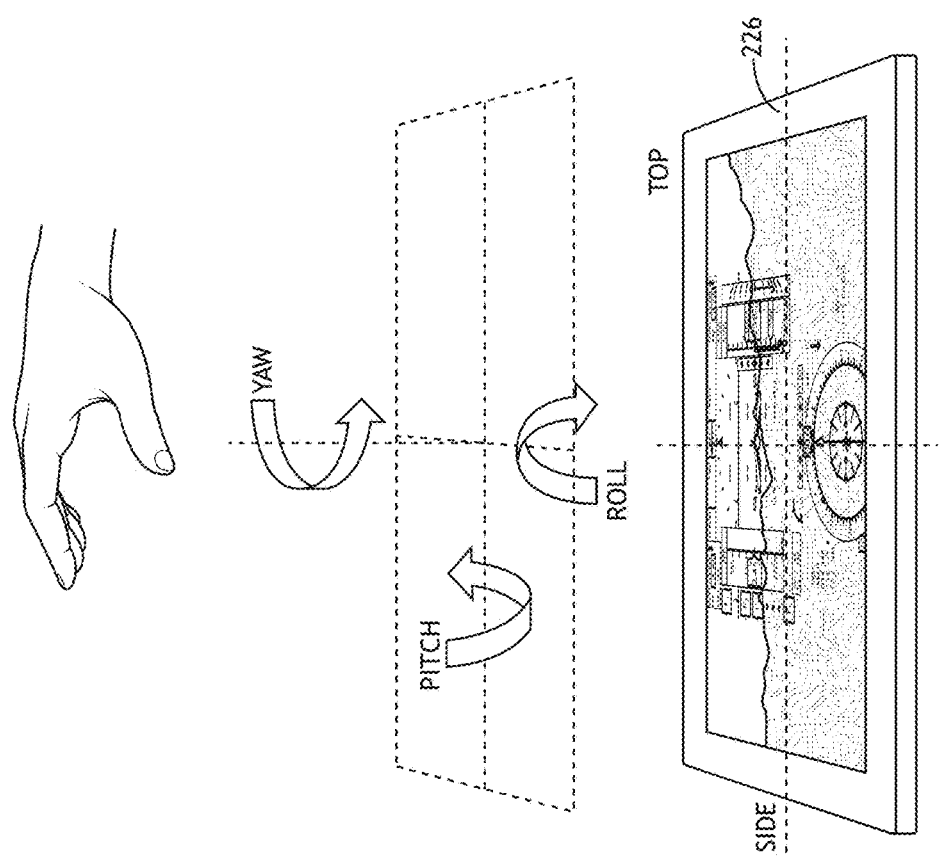
FIG. 13 is a view of pilot gesture-controllable axis relative to the head down display of FIG. 2 with ultrasonic haptic feedback according to the inventive concepts disclosed herein.

Referring now to FIG. 13, an illustrative view of the HDD 226 with the yaw, pitch, and roll axes of the aircraft 102, which may be controlled by pilot gestures with haptic feedback, is shown.

Figure 14:
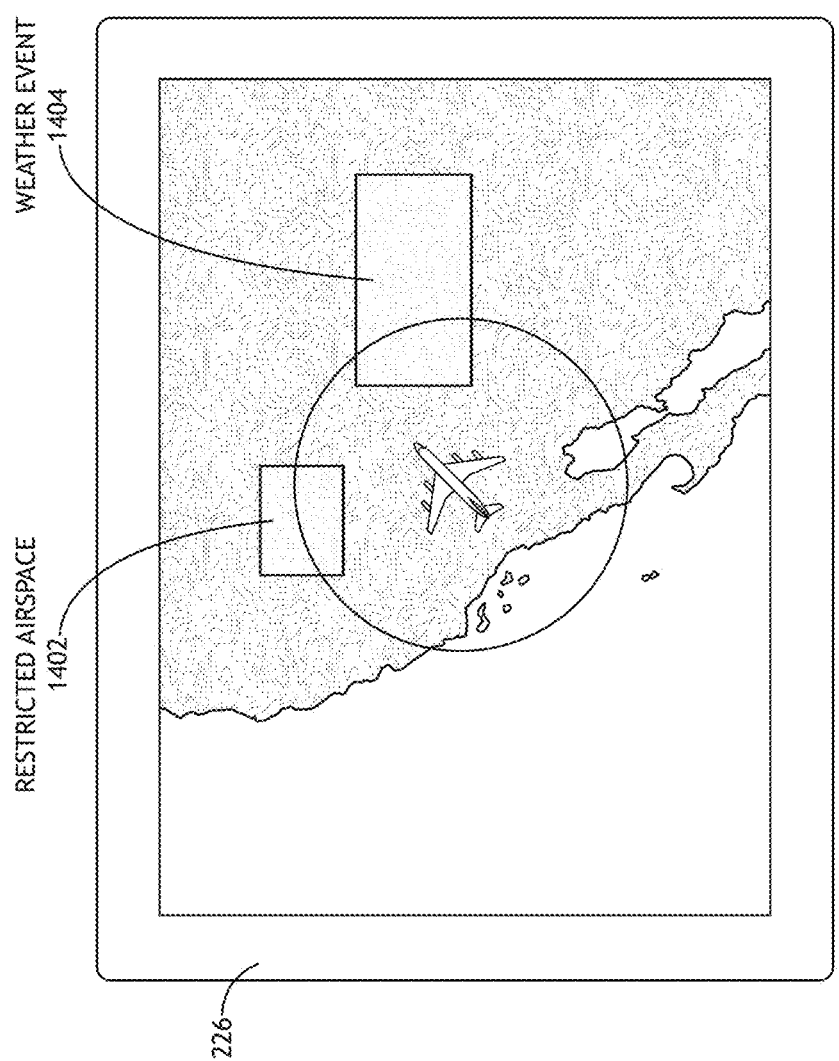
FIG. 14 is a view of the head down display of FIG. 2 according to the inventive concepts disclosed herein.

Referring now to FIG. 14, an exemplary view of the HDD 226 according to the inventive concepts disclosed herein is shown. For example, the HDD 226 may include the haptic feedback system 240 with ultrasonic transducers 242 implemented beneath a screen of the HDD 226. As shown, the HDD 226 is configured to present an image (e.g., a map image) including various regions, such as a restricted airspace region 1402 and a weather event region 1404. The ultrasonic transducers 242 may be configured to form a ultrasonic acoustic field in a spatial region in front of the display area of the HDD 226. The ultrasonic acoustic field may include distinct pressure patterns corresponding to the restricted airspace region 1402 and the weather event region 1404 such that a pilot can distinguish between the restricted airspace region 1402 and the weather event region 1404. While the restricted airspace region 1402 and the weather event region 1404 are exemplarily depicted, ultrasonic acoustic field may include distinct pressure patterns corresponding to any of various suitable regions depicted by the HDD 226.

Figure 15:
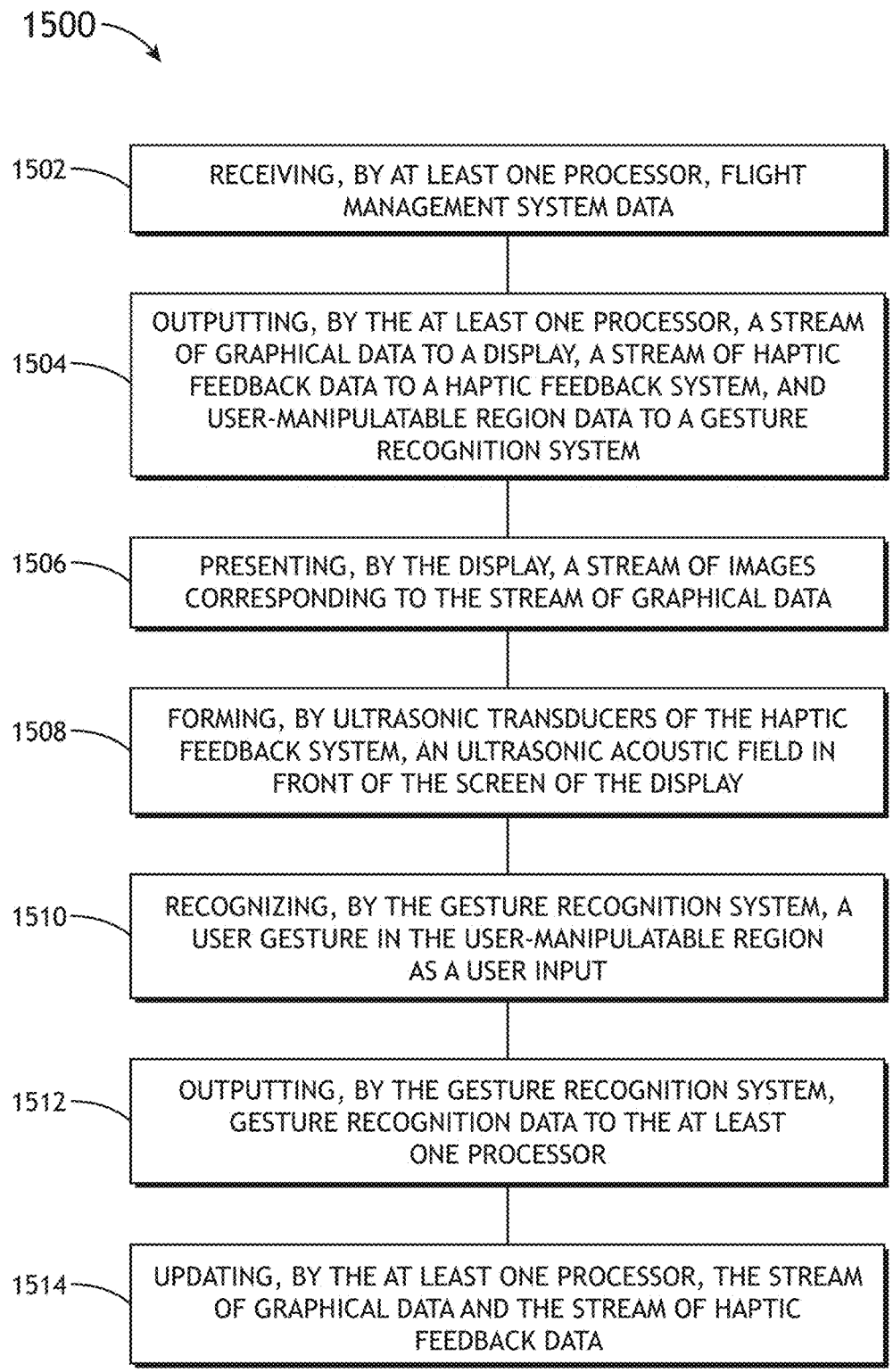
FIG. 15 is a diagram of an exemplary embodiment of a method according to the inventive concepts disclosed herein.

Referring now to FIG. 15, an exemplary embodiment of a method 1500 according to the inventive concepts disclosed herein may include one or more of the following steps. Additionally, for example, some embodiments may include performing one more instances of the method 1500 iteratively, concurrently, and/or sequentially.

A step 1502 may include receiving, by at least one processor, flight management system data.

A step 1504 may include outputting, by the at least one processor, a stream of graphical data to a display, a stream of haptic feedback data to a haptic feedback system, and user-manipulatable region data to a gesture recognition system.

A step 1506 may include presenting, by the display, a stream of images corresponding to the stream of graphical data.

A step 1508 may include forming, by ultrasonic transducers of the haptic feedback system, an ultrasonic acoustic field in front of the screen of the display.

A step 1510 may include recognizing, by the gesture recognition system, a user gesture in the user-manipulatable region as a user input.

A step 1512 may include outputting, by the gesture recognition system, gesture recognition data to the at least one processor.

A step 1514 may include updating, by the at least one processor, the stream of graphical data and the stream of haptic feedback data.

Further, the method 1500 may include any of the operations disclosed throughout.

As will be appreciated from the above, embodiments of the inventive concepts disclosed herein may be directed to a method, a system, and at least one device configured to provide ultrasonic haptic feedback to an operator of a vehicle, such as the aircraft 102.

As used throughout and as would be appreciated by those skilled in the art, "at least one non-transitory computer-readable medium" may refer to as at least one non-transitory computer-readable medium (e.g., memory 110, memory 116, memory 212, memory 234, memory 246, memory 116-1, memory 116-2, storage 118, storage 214, storage 236, storage 248, storage 118-1, storage 118-2, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one ROM (e.g., at least one EEPROM, at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a display;
a haptic feedback system comprising ultrasonic transducers;
a gesture recognition system comprising a gesture recognition system processor and a sensor;
at least one processor communicatively coupled to the display, the haptic feedback system, and the gesture recognition system, the at least one processor configured to:
output a stream of graphical data to the display;
output a stream of haptic feedback data to the haptic feedback system, the stream of haptic feedback data synchronized with the stream of graphical data; and
output user-manipulatable region data to the gesture recognition system, the user-manipulatable region data including information of a user-manipulatable region in front of the display;
wherein the display is configured to present a stream of images corresponding to the stream of graphical data;
wherein the ultrasonic transducers are configured to, based at least on the stream of the haptic feedback data, form an ultrasonic acoustic field in front of the display;
wherein the gesture recognition system is configured to:
recognize a user gesture in the user-manipulatable region as a user input; and
output gesture recognition data to the at least one processor;
wherein the at least one processor is further configured to update the stream of graphical data and the stream of haptic feedback data based at least on the gesture recognition data;
wherein the haptic feedback data includes information of a location of an ultrasonic reference point, wherein the ultrasonic acoustic field includes the ultrasonic reference point; and
wherein images of the stream of images include a cursor at a screen location, wherein the haptic feedback data includes information of a location of an ultrasonic cursor representation, the ultrasonic cursor representation associated with the cursor, wherein the ultrasonic acoustic field includes the ultrasonic cursor representation.

2. The system of claim 1, wherein the at least one processor is further configured to:
receive flight management system data; and
based at least on the flight management system data, output the stream of graphical data to the display, the stream of haptic feedback data to the haptic feedback system, and the user-manipulatable region data to the gesture recognition system.

3. The system of claim 2, wherein the user gesture is a flight control gesture, the user input is a command to perform a flight control maneuver, and the updated stream of haptic feedback data is indicative of the flight control maneuver.

4. The system of claim 2, wherein the flight management system data includes map data.

5. The system of claim 4, wherein the stream of graphical data is associated with the map data, the stream of images is a stream of images of terrain, and the ultrasonic acoustic field is a three-dimensional ultrasonic acoustic field representation of the terrain.

6. The system of claim 5, wherein the user input is a command to manipulate the stream of images of the terrain.

7. The system of claim 1, wherein the haptic feedback data includes haptic feedback alert data.

8. The system of claim 1, wherein the user gesture is a cursor control gesture, the user input is a command to move the cursor, images of the updated stream of images include the cursor at an updated screen location, and the updated stream of haptic feedback data includes an updated location of the ultrasonic cursor representation.

9. The system of claim 1, wherein the at least one processor, the display, the gesture recognition system, and the haptic feedback system are implemented in an aircraft.

10. The system of claim 1, wherein the at least one processor, the display, the gesture recognition system, and the haptic feedback system are implemented in a ground control station.

11. A method, comprising:
receiving, by at least one processor, flight management system data;
based at least on the flight management system data, outputting, by the at least one processor, a stream of graphical data to a display, a stream of haptic feedback data to a haptic feedback system, and user-manipulatable region data to a gesture recognition system, the stream of haptic feedback data being synchronized with the stream of graphical data, the user-manipulatable region data including information of a user-manipulatable region in front of a screen of the display;

presenting, by the display, a stream of images corresponding to the stream of graphical data;

based at least on the stream of the haptic feedback data, forming, by ultrasonic transducers of the haptic feedback system, an ultrasonic acoustic field in front of the screen of the display;

recognizing, by the gesture recognition system including a gesture recognition system processor and a sensor, a user gesture in the user-manipulatable region as a user input;

in response to recognizing the user gesture in the user-manipulatable region as the user input, outputting, by the gesture recognition system processor, gesture recognition data to the at least one processor;

based at least on the gesture recognition data, updating, by the at least one processor, the stream of graphical data and the stream of haptic feedback data;

wherein the haptic feedback data includes information of a location of an ultrasonic reference point, wherein the ultrasonic acoustic field includes the ultrasonic reference point; and wherein images of the stream of images include a cursor at a screen location, wherein the haptic feedback data includes information of a location of an ultrasonic cursor representation, the ultrasonic cursor representation associated with the cursor, wherein the ultrasonic acoustic field includes the ultrasonic cursor representation, wherein the user gesture is a cursor control gesture, the user input is a command to move the cursor, images of the updated stream of images include the cursor at an updated screen location, and the updated stream of haptic feedback data includes an updated location of the ultrasonic cursor representation.

12. The method of claim 11, wherein the user gesture is a flight control gesture, the user input is a command to perform a flight control maneuver, and the updated stream of haptic feedback data is indicative of the flight control maneuver.

13. The method of claim 11, wherein the flight management system data includes map data, the stream of graphical data is associated with the map data, the stream of images is a stream of images of terrain, and the ultrasonic acoustic field is a three-dimensional ultrasonic acoustic field representation of the terrain.

14. The method of claim 13, wherein the user input is a command to manipulate the stream of images of the terrain.

15. The method of claim 11, wherein the haptic feedback data includes haptic feedback alert data.

16. A system, comprising:
a display;
a haptic feedback system comprising ultrasonic transducers;
a gesture recognition system comprising a gesture recognition system processor and a sensor;
at least one processor communicatively coupled to the display, the haptic feedback system, and the gesture recognition system, the at least one processor configured to:
output a stream of graphical data to the display;
output a stream of haptic feedback data to the haptic feedback system, the stream of haptic feedback data synchronized with the stream of graphical data;
output user-manipulatable region data to the gesture recognition system, the user-manipulatable region data including information of a user-manipulatable region in front of the display;
receive flight management system data, wherein the flight management system data includes map data; and
based at least on the flight management system data, output the stream of graphical data to the display, the stream of haptic feedback data to the haptic feedback system, and the user-manipulatable region data to the gesture recognition system;

wherein the display is configured to present a stream of images corresponding to the stream of graphical data;

wherein the ultrasonic transducers are configured to, based at least on the stream of the haptic feedback data, form an ultrasonic acoustic field in front of the display;

wherein the gesture recognition system is configured to:
recognize a user gesture in the user-manipulatable region as a user input; and
output gesture recognition data to the at least one processor;

wherein the at least one processor is further configured to update the stream of graphical data and the stream of haptic feedback data based at least on the gesture recognition data; and wherein the stream of graphical data is associated with the map data, the stream of images is a stream of images of terrain, and the ultrasonic acoustic field is a three-dimensional ultrasonic acoustic field representation of the terrain.

17. The system of claim 16, wherein the user input is a command to manipulate the stream of images of the terrain.

18. The system of claim 16, wherein the user gesture is a flight control gesture, the user input is a command to perform a flight control maneuver, and the updated stream of haptic feedback data is indicative of the flight control maneuver.

19. The system of claim 16, wherein the at least one processor, the display, the gesture recognition system, and the haptic feedback system are implemented in an aircraft.

20. The system of claim 16, wherein the haptic feedback data includes haptic feedback alert data.

* * * * *